US008543237B2

(12) United States Patent
Slettemoen et al.

(10) Patent No.: US 8,543,237 B2
(45) Date of Patent: Sep. 24, 2013

(54) ROTATING PART POSITION AND CHANGE FINDING METHOD AND APPARATUS

(75) Inventors: Gudmunn Slettemoen, Klæbu (NO);
Christian Askeland, Trondheim (NO);
Espen Stenberg, Trondheim (NO);
Torstein Osa Greger, Trondheim (NO);
Jean-Philippe Besuchet, Neuchâtel (CH)

(73) Assignee: Conoptica AS, Klaebu (NO)

( * ) Notice: Subject to any disclaimer, the term of this patent is extended or adjusted under 35 U.S.C. 154(b) by 458 days.

(21) Appl. No.: 12/678,591

(22) PCT Filed: Sep. 17, 2007

(86) PCT No.: PCT/NO2007/000326
§ 371 (c)(1),
(2), (4) Date: Jun. 15, 2010

(87) PCT Pub. No.: WO2009/038465
PCT Pub. Date: Mar. 26, 2009

(65) Prior Publication Data
US 2010/0286812 A1    Nov. 11, 2010

(51) Int. Cl.
*G05B 19/18* (2006.01)
*G06F 19/00* (2011.01)

(52) U.S. Cl.
USPC .............. 700/195; 700/59; 700/162; 700/192

(58) Field of Classification Search
USPC .................................... 700/59, 162, 192, 195
See application file for complete search history.

(56) References Cited

U.S. PATENT DOCUMENTS

| | | | | | |
|---|---|---|---|---|---|
| 4,835,704 | A | * | 5/1989 | Eichelberger et al. | 430/22 |
| 5,198,990 | A | * | 3/1993 | Farzan et al. | 702/168 |
| 5,199,054 | A | * | 3/1993 | Adams et al. | 378/21 |
| 5,383,118 | A | * | 1/1995 | Nguyen | 700/59 |
| 5,501,766 | A | * | 3/1996 | Barbee et al. | 438/14 |
| 5,615,489 | A | | 4/1997 | Breyer et al. | |
| 5,808,888 | A | * | 9/1998 | Susnjara et al. | 700/86 |
| 6,121,218 | A | * | 9/2000 | Thompson | 510/176 |
| 6,631,302 | B1 | * | 10/2003 | Wilson | 700/59 |

(Continued)

FOREIGN PATENT DOCUMENTS

| | | |
|---|---|---|
| DE | 10015005 A1 | 10/2001 |
| DE | 10027106 A1 | 12/2001 |

(Continued)

OTHER PUBLICATIONS

Lei et al., "Accuracy Test of Five-Axis CNC Machine Tool with 3D Probe-Ball, Part I: Design and Modeling", Elsevier Science, p. 1153-1162.*

Modern Machine Shop's Guide to Machining Operations, Woodrow Chapman (ed.), ISBN: 1-56990-357-3, 2004, (Publisher: Hanser Gardner), pp. 79-104.

(Continued)

*Primary Examiner* — Kavita Padmanabhan
*Assistant Examiner* — Thomas Stevens
(74) *Attorney, Agent, or Firm* — Volpe and Koenig, P.C.

(57) ABSTRACT

An apparatus and a method are presented for finding positional relationships and geometrical changes of at least one rotating part attached to or forming part of a machine when the part is in a rotating mode. In the apparatus and method, geometrical changes of the part caused by its state of production and use, determine any locations on the rotating part which exhibit contaminants, and subsequently remove or compensate effects of such contaminants present on the rotating part.

19 Claims, 7 Drawing Sheets

(56) References Cited

U.S. PATENT DOCUMENTS

| | | | |
|---|---|---|---|
| 6,651,351 | B1 | 11/2003 | Christoph et al. |
| 6,681,145 | B1* | 1/2004 | Greenwood et al. .......... 700/193 |
| 7,363,180 | B2* | 4/2008 | Swaringen et al. ............. 702/85 |
| 2003/0045964 | A1* | 3/2003 | Lottgen et al. ................ 700/180 |
| 2004/0059444 | A1* | 3/2004 | Tsukakoshi ..................... 700/59 |
| 2006/0023220 | A1* | 2/2006 | VanWiggeren et al. ...... 356/445 |
| 2009/0218488 | A1* | 9/2009 | Wells ............................. 250/307 |
| 2010/0080446 | A1* | 4/2010 | Herschbein et al. .......... 382/149 |

FOREIGN PATENT DOCUMENTS

| | | |
|---|---|---|
| DE | 10153581 A1 | 5/2003 |
| WO | 0128737 A1 | 4/2001 |
| WO | 2007032681 A1 | 3/2007 |

OTHER PUBLICATIONS

Modern Machine Shop's Handbook for the Metalworking Industries, Woodrow Chapman (ed.), ISBN: 1-56990-345-X, 2002 (Publisher: Hanser Gardner), pp. 273-298.

\* cited by examiner

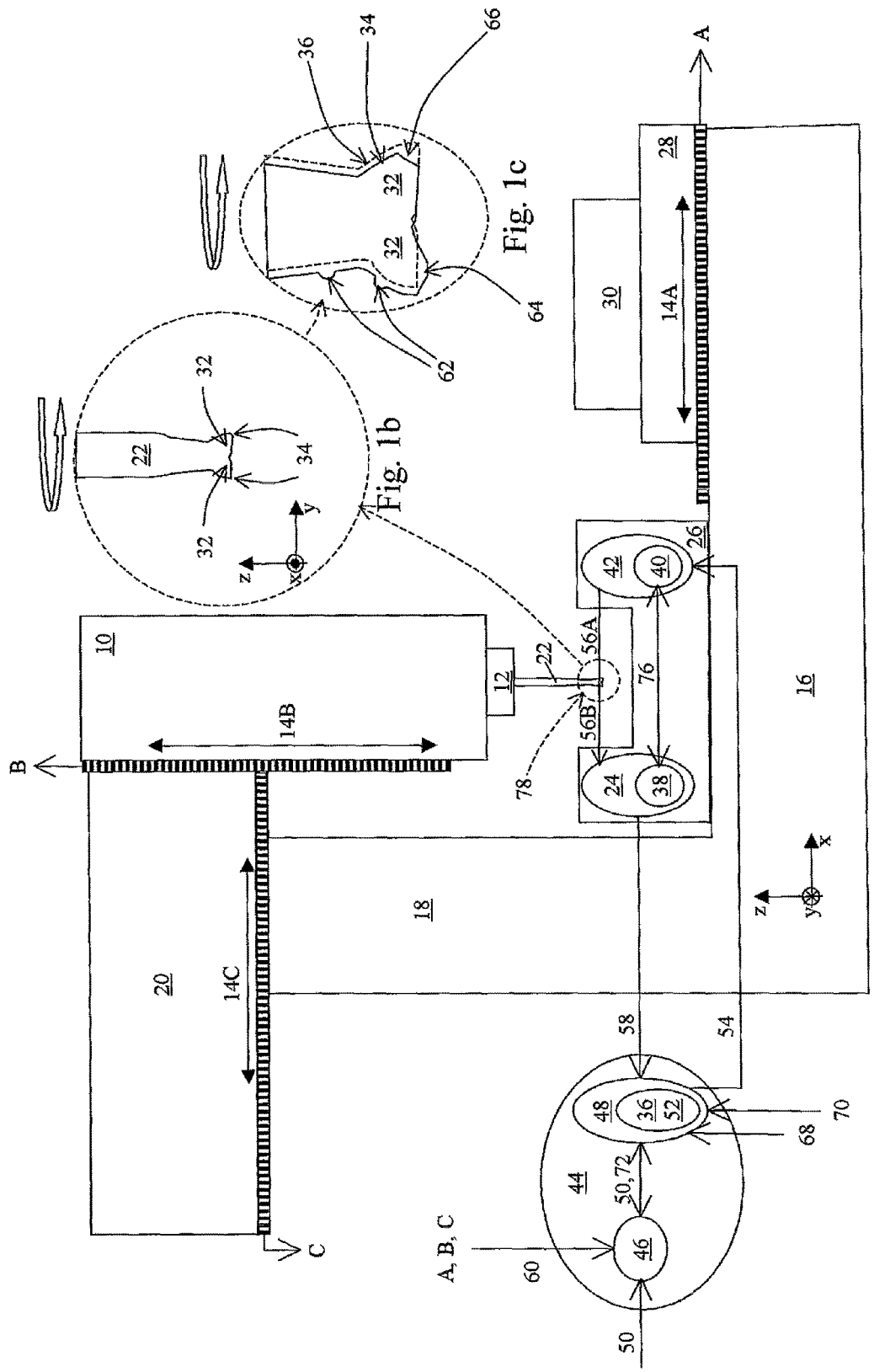

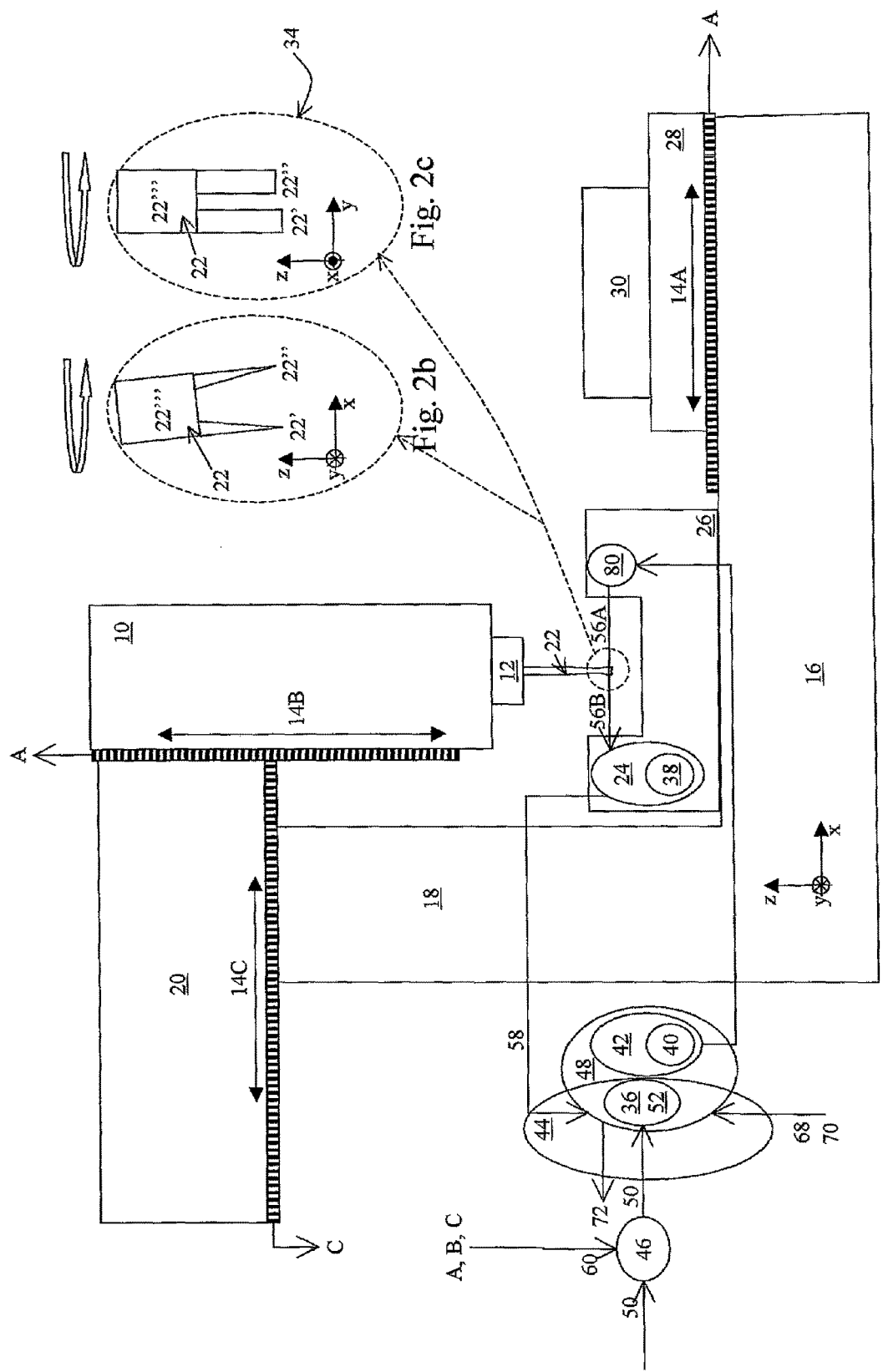

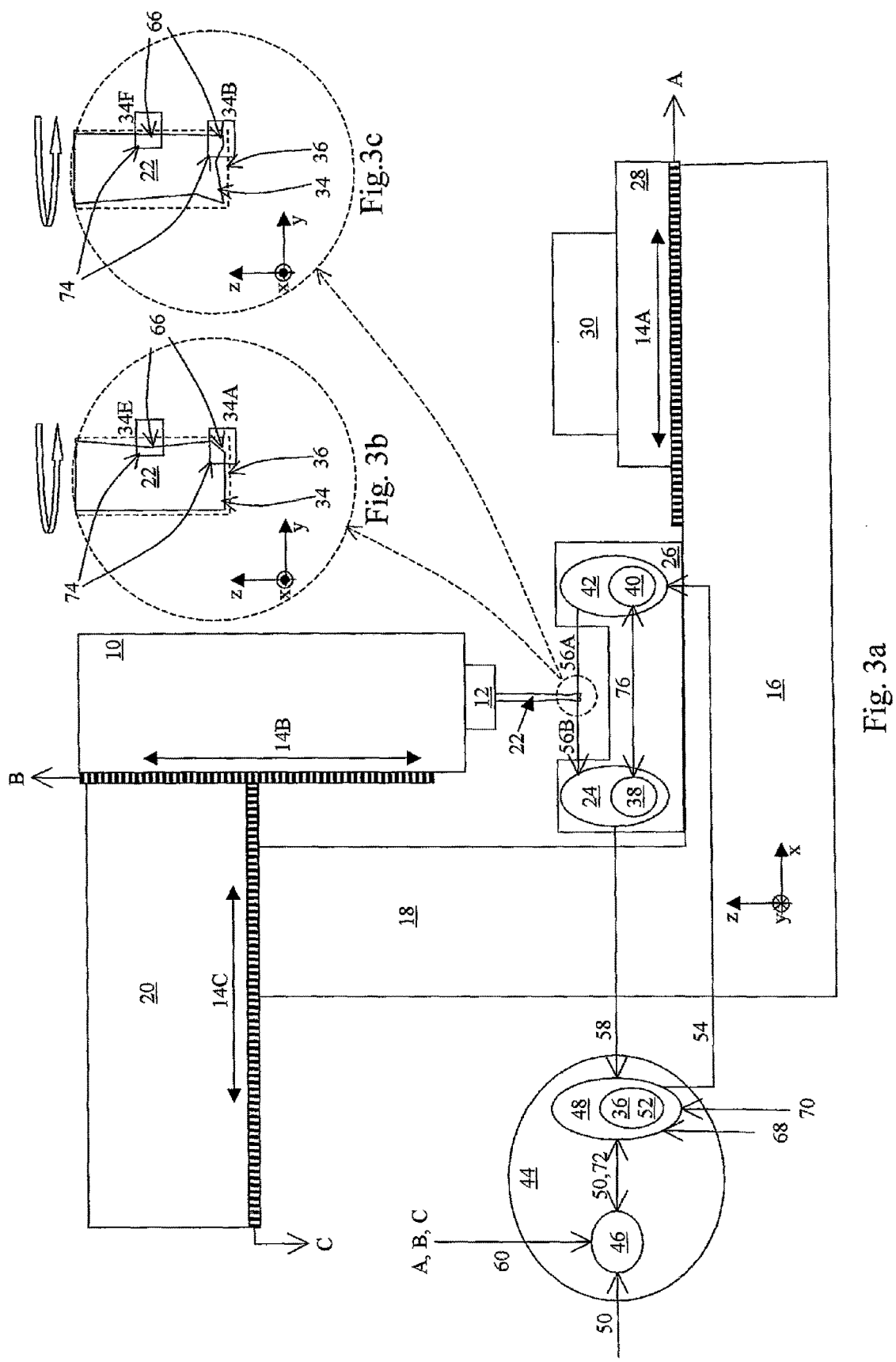

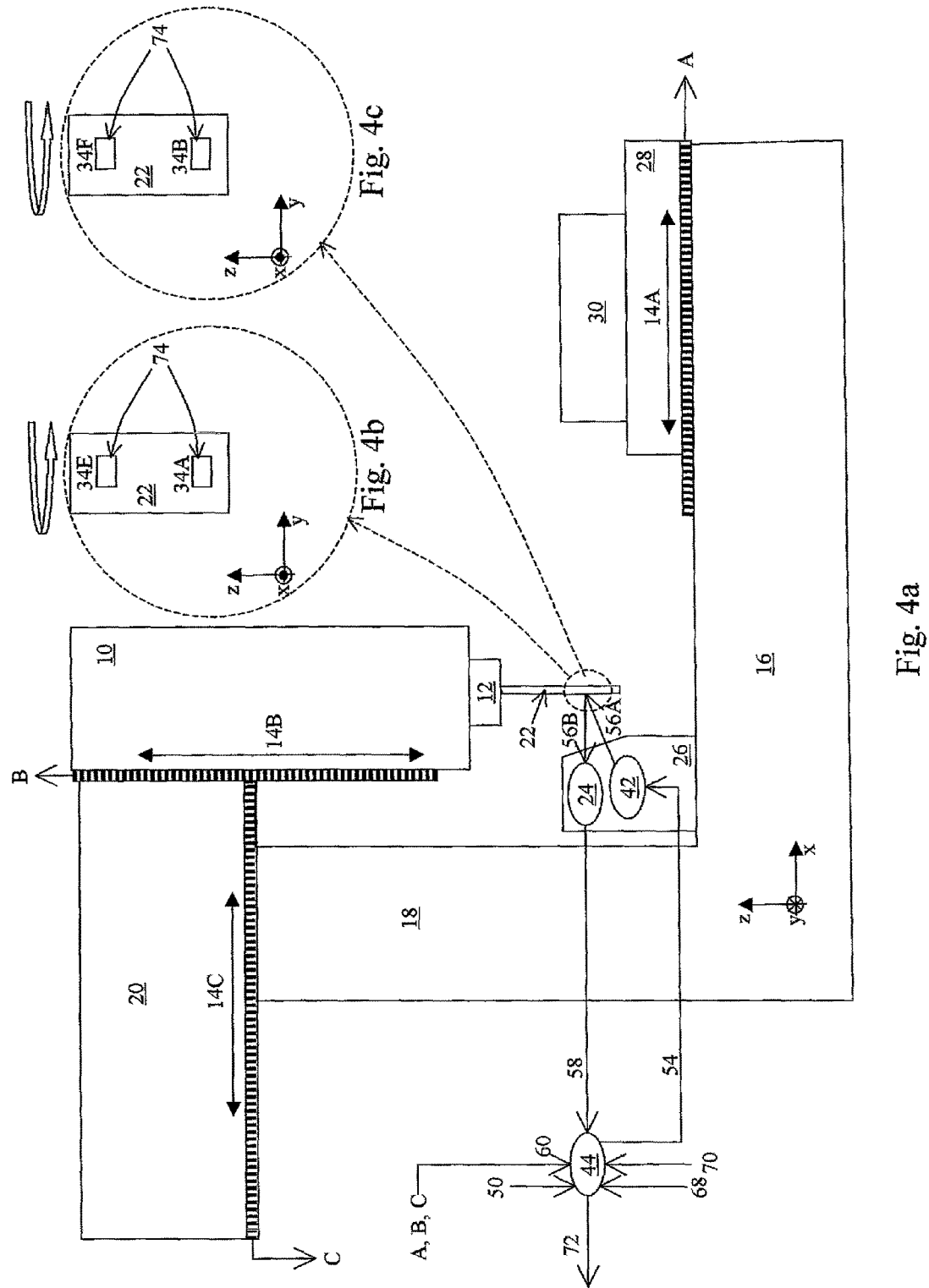

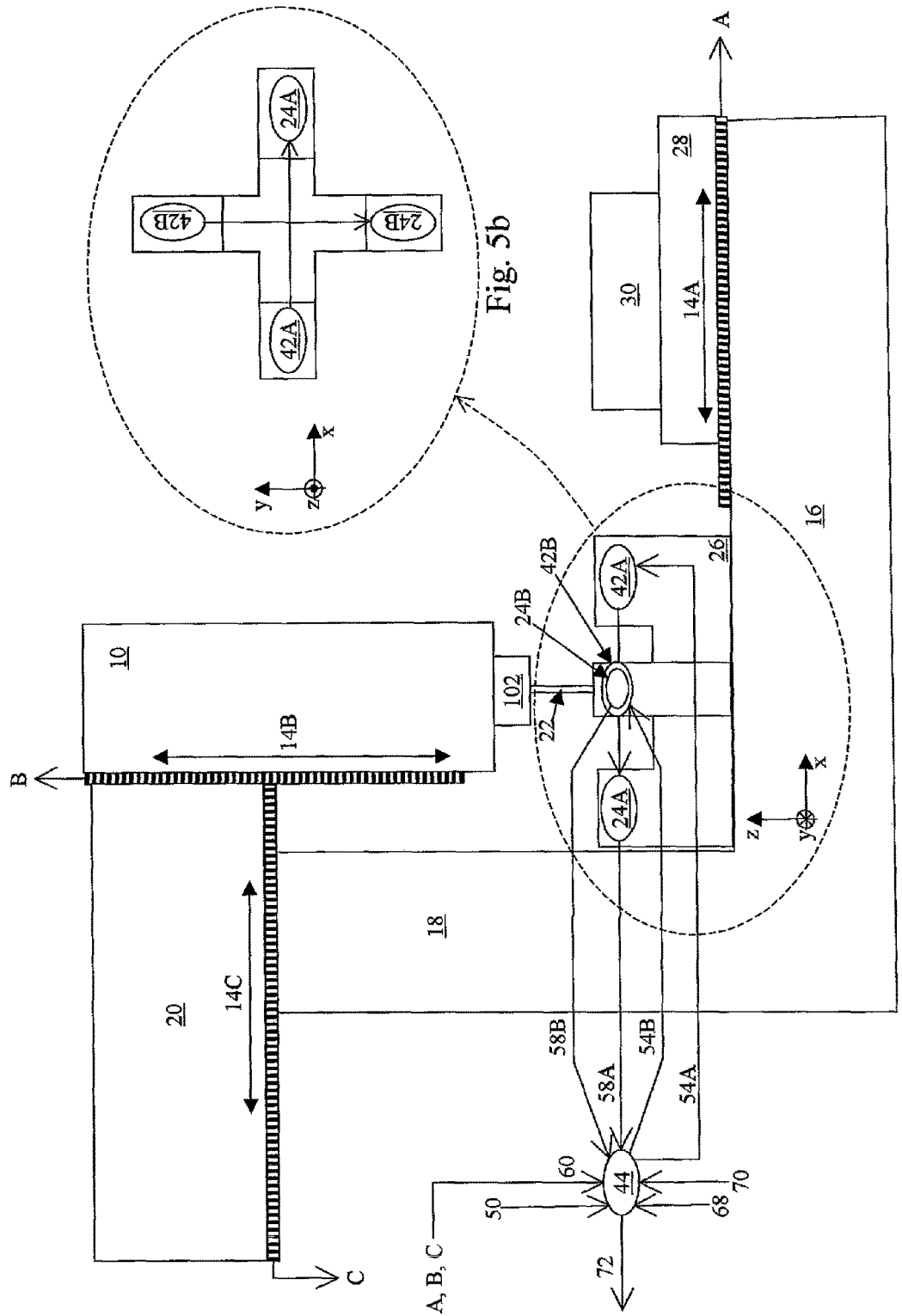

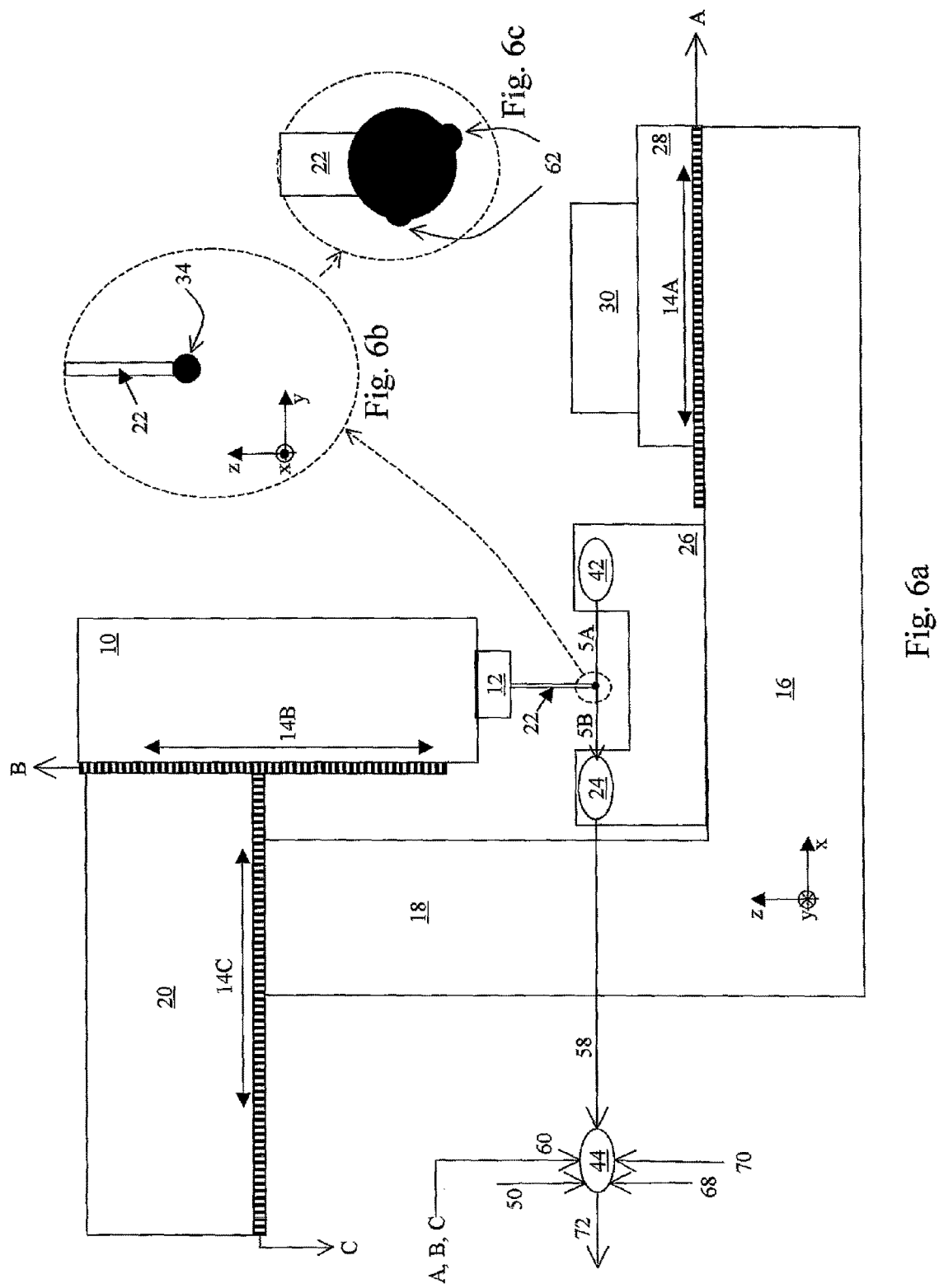

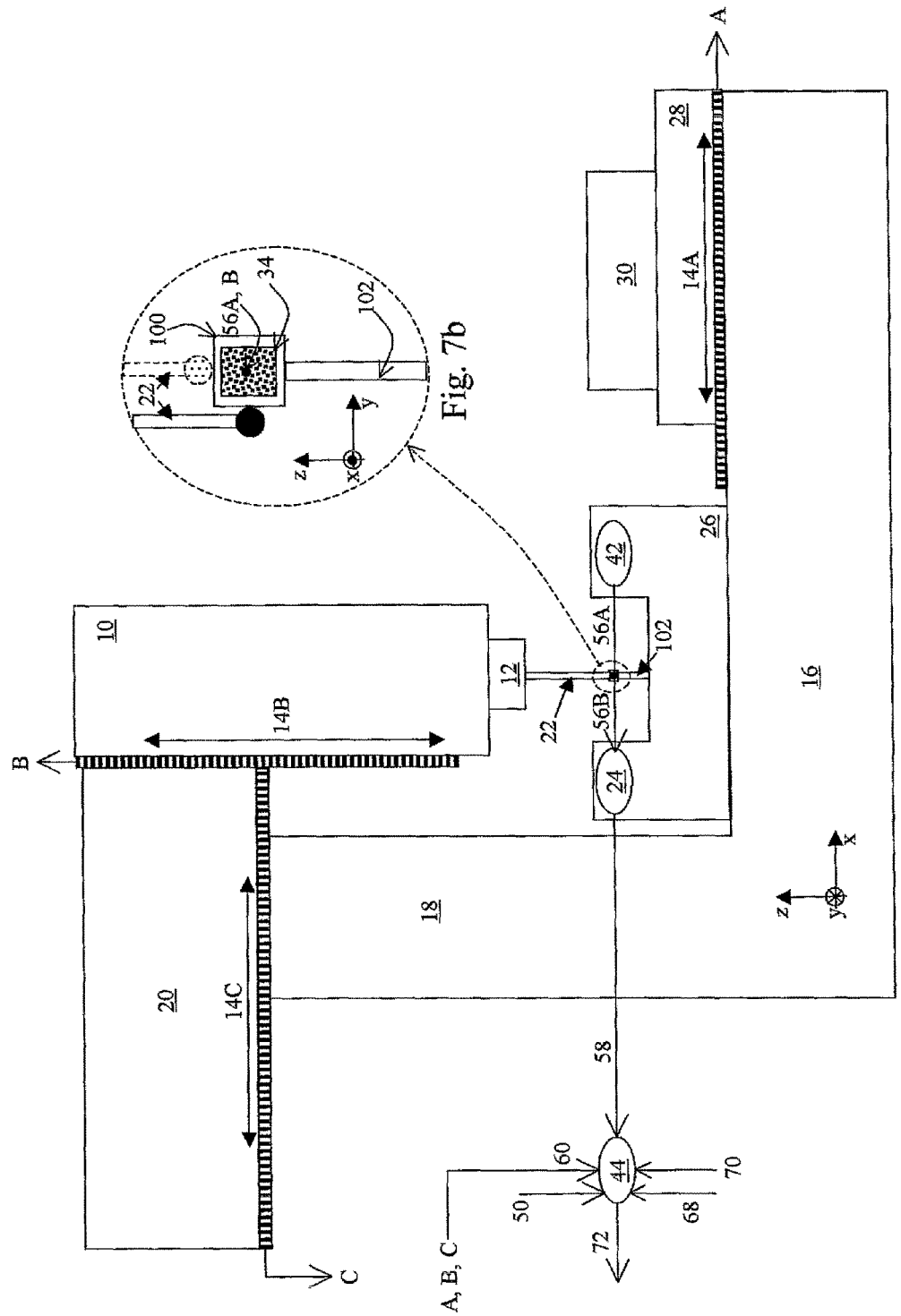

ROTATING PART POSITION AND CHANGE FINDING METHOD AND APPARATUS

BACKGROUND OF THE INVENTION

Description of the Related Art

The present invention relates to the field of technical arrangements and methods for determining positions and changes for determining positional deviation and changes that has occurred in the course of a mechanical machining operation or a mechanical control activity.

Further, the invention relates to a quality control touch probing method for enabling a position of a quality control tool in the form of a touch probe to be related to position of a rotating part.

In order to simplify this disclosure by uniquely identifying important parts related to a typical machine system, which may be a system for mechanical quality control, the following explains the use of some general terms.

The term "machine" denotes any production or quality control machine, such as machining centers for milling, drilling, turning, grinding, polishing, cutting, bending, forming, etc., an EDM (Electrical Discharge Machine), a CMM (Coordinate Measuring Machine), a touch probe and stylus position sensing machine, a computer vision system, even a simple mechanical support structure, or similar.

"Work piece" denotes a part to be machined or to be subjected to quality control. The actual area on the work piece that has been machined, or quality controlled, is denoted "work area".

The part or device that is performing the actual machining or quality control of the work area is denoted "work tool". The work tool can be a machining tool (for milling, turning, drilling, etc.), a spark erosion tool (EDM tool), a touch probe or stylus position sensor, an optical imaging sensor, an electromagnetic sensor, or similar.

All the mechanical parts of a machine including different support structures, work pieces, work tools, work holders, and parts of the apparatus of the present invention, are called "machine part".

The "position" of the work tool, or other different parts of a machine, etc., shall, unless otherwise stated, in this document typically mean the position, orientation, or both of the aforementioned, relative to another part.

The term "contaminant" will in this context represent non permanent material resting on a machine part, such material being one or more of oil, water, chip residues, and other material with similar properties.

The term "buildup" is defined as material that sticks to the part on a more permanent basis.

The term "wear" relates to machine part dimensional changes due to use.

To find position, or counteract the fact that unaccountable positional and geometrical changes may occur, several techniques are in common use such as: mechanical touch probe and stylus sensing, macroscope and microscope viewing, laser beam obstruction sensing, and pressure transducer sensing, see "Modern Machine Shop's Handbook for the Metalworking Industries"; Editor Woodrow Chapman, ISBN: 1-56990-345-X; 2002, 2368 pages, (Publisher: Hanser Gardner) and "Modern Machine Shops Guide to Machining Operations"; Woodrow Chapman; ISBN: 1-56990-357-3, 2004, 968 pages (Publisher: Hanser Gardner).

In many cases there is no time to slow down the rotation of a machine part to control its position in a static or nearly static condition. Except for the laser beam obstruction the mentioned techniques do not have the capability, and sufficient temporal resolution, to control rotating tools at high speed. The touch probe determines the position of the static work piece by use of a position sensing stylus tip. However, if a machining tool is made to slowly rotate in the reverse direction a variant of the touch probe approach can be used. In that case the touch probe "tip" is a plane surface against which the machining tool is rotating.

For the non contact position control of rotating work tools, running at their full speed, the work tool can be made to approach a focused laser beam and apply means to read the degree of beam obstruction. To find the geometry of a rotating machine part, specifically a work tool tip, repeated recordings of a laser beam obstruction is not sufficiently reliable. In theory a laser obstruction unit might be able to do the job. However such a technique would be time consuming and would have difficulty in discriminating between part contaminants, wear, and buildup, thereby reporting unreliable position data.

One of the inventors of the present invention describes in PCT/NO2005/000336 how so called fiducial patterns can be combined with optical techniques to accurately relate positions of machine parts to each others. That invention does not account for the position control of machine parts rotating at high speeds.

OBJECTIVES OF THE INVENTION

The objective of the present invention is to overcome all or part of the aforementioned limitations and shortcomings, by improvements of the overall position reading precision and speed, and the machine part handling reliability of machines. The present invention is therefore intended to be used to improve the machining and quality control position accuracy of any machine by finding the positions of the work tool and different machine parts, remove the effect of contaminations, and characterize buildup, wear, and tear thereon. In particular, the apparatus of the invention is useful for application on rotating work tools.

SUMMARY OF THE INVENTION

The present invention provides an apparatus for finding part positional relationships of parts of mechanical and optomechanical machining and quality control systems, for removing the effect of contaminants on rotating parts, for characterizing machine parts wear and tear, as well as buildup of machining material on rotating parts.

The present invention provides a method for finding positional relationships and geometrical changes of parts of a machine, of parts of apparatus made according to the present invention, and for removing the effect of contaminants.

The present invention relies on optical contactless sensing technology and aims at providing an in-the-process quality control technique that regularly and automatically can provide updates of position information for key rotating machine parts without having to rely on external quality control and calibration means.

The present invention determines the position and size of parts rotating at high speeds, even when the parts are contaminated by residues of oil, water, machining chips, etc. Especially, the invention determines the position and size of part details called fiducial patterns. It is also able to cause removal of the effects of contaminants and determines geometrical changes of the rotating parts by applying fiducial pattern models. It ensures high position accuracy by carefully discriminating between fiducial pattern models and fiducial pattern image models.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present disclosure.

FIGS. 1a-c illustrate generally a first example of the inventive apparatus for use on a machine having rotary parts in operation.

FIGS. 2a-c illustrate generally a second example of the inventive apparatus for use on a machine having rotary parts in operation.

FIGS. 3a-c illustrate generally a third example of the inventive apparatus for use on a machine having rotary parts in operation.

FIGS. 4a-c illustrate generally a fourth example of the inventive apparatus for use on a machine having rotary parts in operation.

FIGS. 5a-b illustrate generally a fifth example of the inventive apparatus for use on a machine having rotary parts in operation, the apparatus having two pairs of illuminators and optical detectors.

FIGS. 6a-c illustrate that the same arrangement that is used for controlling rotating work tools can easily be adapted to study static work tools, like an unloaded touch probe of this figure.

FIGS. 7a-b illustrate that the same arrangement that is used for controlling rotating work tools can easily be adapted to study nearly static work tools, like the trigger position control of a touch probe of this figure.

The invention is now firstly to be described with reference to FIG. 1. FIGS. 1-5 schematically exemplifies machines covered by the present invention where 34 exemplifies fiducial patterns integrated with rotating parts within these machines. These fiducial patterns 34 can be geometrical part details or part surface structure.

FIG. 1 shows a functional diagram that illustrates key ideas of the present invention. An optical detector 24 and illuminator 42 are fastened to a machine part 16. The illuminator 42 illuminates the rotating machine part 22 along an optical path 56A and the optical detector 24 observes the same machine part along an optical path 56B. On the basis of a request 50 to a part position finder 44, containing reference to a fiducial pattern model 36 or a fiducial pattern image model 52 of the rotating machine part 22, the part position finder 44 defines control 54 of the illuminator 42. The illuminator 42 provides pulsed illumination onto the rotating machine part 22 to optically reduce rotation blur and make it possible to reconstruct image exposure timing. Images from the optical detector 24 are controlled by a timer 38, the light pulses from illuminator 42 are controlled by a timer 40, and for improved performance the timers are synchronized 76. Images of fiducial patterns 34, that form parts of the machine part 22, are detected by means of the optical detector 24, converted to fiducial pattern images 58, and recorded by the part position finder 44. On the basis of part change constraints 68 the part position finder 44 determines the machine part changes 72 that are computed from fiducial pattern image 58 changes relative to the fiducial pattern image model 52. To derive machine part changes 72 the part position finder 44 applies knowledge about the part geometry relations 70 where the machine position data 60 are taken into account.

FIG. 1 is a schematic drawing illustrating generally one example of a machine, representing any machine such as a milling machine, turning machine, drilling machine, Die sinking EDM (Electrical Discharge Machine), CMM, etc. Note that for clarity the optical assembly 26 has been turned ninety degrees around the z-axis, i.e. the work tool 22 should rather be translating through the open gap, a detection zone 78, of the optical assembly 26. The figure illustrates the position control of a milling tool 22 that is rotating at full speed. The magnified work tool tip FIG. 1c shows a milling tool that may contain contaminants 62, such as oil, water, and machining chip residues. The tool might also be affected by wear 66 and buildup 64 that needs to be reliably characterized.

FIG. 2 is a schematic drawing illustrating generally one example of a machine, representing any machine such as a milling machine, turning machine, drilling machine, Die sinking EDM (Electrical Discharge Machine), CMM, a calibration jig, etc. The figure illustrates how the position control of a rotating calibration pin 22 can help calibrating alignment and control of the optical detector 24 and the optical assembly 26 relative to the machine.

FIG. 3 is a schematic drawing illustrating generally one example of a machine, representing any machine such as a milling machine, turning machine, drilling machine, Die sinking EDM (Electrical Discharge Machine), CMM, etc. The figure illustrates the position control of a rotating work tool 22. The magnified illustration of FIG. 1b-c show a bar shaped EDM die 22. The dashed line indicates the fiducial pattern model 36 and the fully drawn line indicates the outline of a worn die. Images of the fiducial patterns 34A, 34B, are recorded in one rotation scan, while images of the fiducial patterns 34E, 34F are recorded in another rotation scan. In FIGS. 3b-c the size of the field of view 74 is indicated with rectangles.

FIG. 4 is a schematic drawing illustrating generally one example of a machine, representing any machine such as a milling machine, turning machine, drilling machine, Die sinking EDM (Electrical Discharge Machine), CMM, etc. The figure illustrates the position control of a rotating work tool 22 where the tool is observed by reflected light from its surface. For simplicity the magnified illustration in FIG. 4b-c show a bar shaped EDM die 22. Images of the fiducial patterns 34A, 34B, are recorded in one rotation scan, while images of the fiducial patterns 34E, 34F, are recorded in another rotation scan. The fiducial patterns are surface structure 34 in the die. In FIGS. 4b-c the size of the field of view 74 is indicated with rectangles.

FIG. 5 shows a combination of two illuminator 42—optical detector 24 arrangements similar to the ones illustrated elsewhere. The combination of the optical path between the illuminator 42A and optical detector 24A, and between the illuminator 42B and optical detector 24B helps triangulate full 3D data about the rotating work tool 22. The illuminator-detector combinations need not be arranged into one optical assembly 26 as illustrated. Depending on space requirements they can be placed separately inside the machine.

FIG. 6 illustrates that the same arrangement that is used for controlling rotating work tools 22 can easily be adapted to find the position of static work tools, like the unloaded touch probe 22 of this figure. I.e. a machine tool and quality control tool can be made to refer to exactly the same position in space.

FIG. 7 illustrates that the same arrangement that is used for controlling rotating work tools 22 can easily be adapted to find the position of nearly static work tools, like the trigger position control of the touch probe 22 of this figure. The illustration indicates that by pneumatically introducing a glass cube 100 into the field of view, against which the touch probe can trigger, the trigger position can be found. To find this trigger position a transparent frosted glass sheet 34 is attached to the glass cube 100. To make space for a machine tool the glass cube is pulled out of the detection zone by means of a pneumatic control.

DETAILED DESCRIPTION OF THE INVENTION

In the following detailed description, reference is made to the accompanying drawings which form a part hereof, disclosing by way of illustration specific, yet merely amplifying embodiments of how the invention may be practiced. These embodiments are described in sufficient detail to enable those skilled in the art to practice the invention, and it is to be understood that two or more of the embodiments may be combined, or that structural, logical and electrical changes may be made to arrive at other embodiments, however without departing from the concepts of the present invention. The following detailed description is, therefore, not to be taken in a limiting sense, and the scope of the present invention is defined by the appended claims and their technical equivalents.

The term "fiducial pattern" of a machine part is any geometric characteristics, including the surface structure itself, of that part. The "fiducial pattern image" is the image of that fiducial pattern as presented by the optical detector. The "fiducial pattern image model" is a mathematical model describing the image geometrical characteristics of the fiducial pattern as they appear in the optical detector 2D image projection, including image distortion, etc. The "fiducial pattern model" is a mathematical model describing 2D and 3D geometry of the fiducial pattern as it is given, or by reverse projection appears to be given in space. I.e. the fiducial pattern model is a mathematical model that is geometrically mapped to the fiducial pattern image model through mathematical image descriptions.

In the following examples, a reference coordinate frame position, or simply a frame, represents the position, including orientation, of a component, or a part of a larger structure, relative to another component, or part of a larger structure. The specification of a frame position may both represent nominal and measured positions. The term "frame relations" represents frame positions and the fact that components or parts are mechanically or optically interlinked, or that parts of a larger structure are mechanically interlinked. In one of its simplest form, the frame relations may only describe four frames that for example represent a machine support structure, a moving part inside a machine, a part fastened to the moving part, and an optical detector fastened to the support structure. Then the position of the part fastened to the moving part may be determined from data provided by the optical detector. In other cases, the reference frame relations may represent a more complicated mechanical structure. Basic principles of the application of frames within the applications covered by the present document are described in PCT/NO2005/000336.

EXAMPLE 1

FIG. 1a is a schematic drawing illustrating, by way of example, a machine that may represent any machine such as a milling machine, drilling machine, turning machine, Die sinking EDM, Wire EDM, CMM, or similar. These machines can be equipped with a range of different mechanical configurations, but all can be equipped with an apparatus according to the present invention. We indicate some key elements of these machines as a work piece carrier 28 (performing movements like two orthogonal translations x, y and rotations around the same axes), a work tool carrier 10 (in this example performing two translations, in the x and z directions), a work tool chuck 12, position encoders 14A, 14B, 14C, and a support structure 16. The support structure is in this example indicated to include a base support 16, a machine support link 18, and a work tool support 20. The purpose of this machine configuration and example is to find the cutter edge positions of a work tool 22 relative to the position of the optical detector 24. The optical detector 24 is via the optical assembly 26 fastened to the base support 16. In this example the work tool 22 is fastened to the work tool chuck 12, and the work tool 22 is a milling tool with four cutters equally distributed around the rotation circumference. Moving the milling tool 22 relative to the optical assembly 26 and base support 16, by means of the work tool carrier 10, work tool support 20, and the work piece carrier 28, performs displacements necessary for the position and geometry measurement to take place. During process the position of these carriers is read at the locations of the position encoders 14A, 14B, and 14C. Note that for ease of illustration the optical assembly 26 has been rotated 90 degrees around the z-axis.

FIGS. 1a-c show a milling tool 22 that is a production tool for the machining of a work piece 30. At the tip of the milling tool 22 there are cutters 32 that actually perform the machining/cutting action. The present example illustrates how to find the cutter edge positions, relative to other machine parts, while a small diameter milling tool 22 is rotating at a high speed, e.g. at 27000 rpm (revolutions per minute). We assume that the milling tool 22 is new and has four clean cutter edges 34, and that a parametric fiducial pattern model 36 is used. We also assume that the timer 38 of the optical detector 24 and the timer 40 of the illuminator 42 are not exchanging synchronization signals 76. In the present example we shall find the radius distance and lengths of each of the cutter edges 34 individually. When the tool is measured, the position of the position encoders 14B, and 14C are also read. Those positions represent the machine position 60.

The present example is illustrated in FIG. 1a-c. The part position finder 44 can be embodied as process within a computer, personal computer, dedicated processor, or similar. In this example we shall assume that part position finder 44 processes are carried out by means of two computers, a machine NC (Numerical Control) computer 46 together with an additional computer 48 dedicated to the control and monitor of the optical assembly 26.

A request 50 is entered from another computer (not shown in FIG. 1a-c) telling that the machine part is a rotating milling tool 22. The request 50 defines parametrically the milling tool 22 type (e.g. bull nose, flat end, milling head with cutter tips, etc), number of cutters, nominal dimensions, and that a nominal internal fiducial pattern model 36 should be built and applied on the basic of this information. The NC computer 46 adds to the request 50 that the rotation speed is e.g. 27000 rpm. Note that we discriminate between a fiducial pattern model 36 and a fiducial pattern image model 52. The fiducial pattern model 36 is a description of the 2D/3D model characteristics in space. The fiducial pattern image model 52 is the 2D projection image of that model that includes image distortion, etc. The part position finder 44 is able to derive the geometrical data of one model from the other. The request 50 may also define the measurement quality needed. An illuminator 42 receives the control data 54 from a computer 48 necessary for the illuminator 42 to create pulsed illumination of the fiducial pattern 34 along the optical path 56A.

To create a predictable optical detector 24 exposure timing, and optically freeze the rotation movement, the illuminator 42 includes in the present example a dedicated electronic circuit running with an internal timer 40 at a repetition rate of e.g. 1 microsecond. The optical detector 24 is free running with a timer 38 rate of 60 images per second. It records along the optical path 56B fiducial pattern images 58 of the fiducial patterns 34, the cutter edges, while the milling tool rotates at the speed of 27000 rpm. The images are relayed to the computer 48. A magnified and rotated view of the milling tool 22 and its cutter edges 34 is shown in FIGS. 1b-c. The coordinate axes of FIGS. 1a-b indicate the orientation of the different views. The cutter edge 34 is back illuminated by the illuminator 42 and the fiducial pattern images 58 are shadow images of the cutter edges 34 in different angular orientations. On the basis of input request 50 from the NC computer 46, the computer 48 calculates an optimum number of fiducial pattern images 58 to be recorded. The computer 48 might also base its illumination calculation on a standard number of images that from experience is known to work well. Assume that this number is 100 images. With equally distributed images around the circumference the 100 images results in one image per 360/100=3.6 degrees.

Then the computer 48 calculates the pulse width and repetition rate that enables the illuminator 42 to illuminate the full circumference of the cutter edges 34 with 100 nearly equally spaced images. 27000 rpm is equal to 450 rotations per second. In order to cover the full circumference in 1.66 seconds (100 images at a rate of 60 images per second) this would give an illumination pulse rate of 450 (100/101)=445.5 pulses per second. In order to optically freeze the rotation movement the pulse width should be less than the passing time of an 100'th of a rotation cycle, i.e. less than 1/(450*100)=0.0000222 seconds (22.2 microseconds). These illumination parameters are transmitted from the computer 48 to the illuminator 42 as a control 54 signal. The illuminator 42 contains an dedicated electronic circuit that on the basis of the control 54 is able to produce the calculated illumination pulses by means of e.g. a LED (Light Emitting Diode).

The fiducial pattern images 58 are by known means converted/digitized and will be available for computer 48 operations. The computer 48 saves these 100 images in 1.66 seconds. Without delay the milling tool 22 machine positions 60, represented by the positions of the encoders 14B and 14C, are recorded by the NC computer 46. The optical detector 24 is a 2D (two-dimensional) array camera. Both the illuminator 42 and the optical detector 24 are, by means of the optical assembly 26, fastened to the base support 16.

Since the series of images were recorded at an arbitrary angular starting position in the rotation cycle, the computer 48 has at first to refer each of the fiducial pattern images 58 to their correct angular position. To do that it creates a function of the extreme +y-cutter edge positions of those images as a function of image number. From this function it calculates the angular positions of the maxima relative to the images. With four cutter edges this creates four function maxima. There will also be a nearest neighbor image to each of those four maxima. These images will be marked as the primary fiducial images 58 of the cutter edge 34. We assume that the rotation axis is located close to the image center and that the milling tool diameter is less than optical detector 24 field width. This means that the computer 48 can repeat the above calculations also in the −y-direction, creating in effect two primary fiducial images 58 per cutter.

The fiducial pattern model 36 is in FIG. 1c indicated with a dashed line. For clarity it is shifted slightly to the right compared to the fully drawn line that represents the shadow outline of one of the cutter edge 34. The present example assumes that the cutter edges 34 are new and clean, i.e. the contaminants 62 are assumed to be small and the edges do not have accumulated buildup 64 or started to wear 66, i.e. it this example the shadow image resembles more like the magnified illustration in FIG. 1b. In the present example the part change constraints 68 are defined by the cutter edge positions that are allowed to shift in the y- and z-directions. The part change constraints 68 are predefined and stored in the computer 48. The shift might be due to the positioning of the milling tool 22 inside the chuck 12, or due to the fact that the position of the cutter edges 34 are manufactured slightly different from the nominal model 36 position.

The NC computer 46 handles the machine positions 60. In the present example they are relayed to the computer 48 for frame loop evaluations that involve the machine positions 60. The position encoder 14B data are added to the position of the frame 10, representing the work tool carrier 10 position relative to the work tool support 20. The position encoder 14C data are added to the position of the frame 20, representing its position relative to the machine support link 18.

The part position finder 44 initial conditions are defined by part geometry relations 70 that have been earlier calibrated and stored in the computer 48, in the part position finder 44. At the time of optical assembly 26 alignment and calibration the optical assembly 26 relevant part geometry relations 70 has been created. See e.g. Example 4. This ensures that the initial part geometry relations 70, where the optical detector 24 includes the fiducial part image model 52, and the milling tool 22 includes the fiducial pattern model 36, are consistent with each others, i.e. for example all coordinate frames reproduce correctly any spatial position within the geometry, and especially that the calculation of a position through any closed loop of the part geometry relations 70 of FIG. 1a replicates itself.

The primary fiducial pattern images 58 of the cutter edges 34, angular distances of those images from the maximum positions mentioned above, and the corresponding machine position data 60, are taken care of by updating the part geometry relations 70 of the computer 48 (In the simplest case the machine position data 60 need not be transferred from the NC computer 46 to the computer 48. The computer 48 may assume a fixed set of machine position data 60, and when the NC computer 46 receives the part change data 72 it takes the machine position data 60 into account). The computer 48 first calculates a raw data version of the fiducial pattern image 58 and then rotates those data into the maximum position. The raw data are found by means of conventional image processing edge finding routines. Optionally the computer 48 adapts a mathematical spline to those data in a least square sense (by iteratively deforming the spline and finding the minimum of the least square sum of distances between the spline and the raw data). We shall call this spline the adapted fiducial pattern image model 52A.

The computer 48 calculates the y- and z-displacement of the fiducial pattern image model 52 that best fit the rotated raw data positions calculated above. The computer 48 first creates a mathematical spline function describing the fiducial pattern image model 52. It then iteratively displaces this image model in the y- and z-directions to best fit the rotated raw data, where the y-positions represent radius distances from the rotation center and z-positions represent tool cutter lengths. The spline displacements are calculated by iteratively translating the image model spline in the y- and z-direction and finding the minimum of the least square sum of distances between the spline and raw data. Alternatively, these displacements can be found by finding the y- and z-extrema of the adapted fiducial pattern image model 52A and the fiducial pattern image model 52, respectively and subtract those values from each others. The above calculations are repeated for all four cutter edges 34.

Note that the adapted spline function 52A, describing the rotated cutter edge image 58, can be transformed into a new fiducial pattern image model 52, specifically representing the geometry of this identified cutter edge. This new model makes it possible to later check the wear and buildup of this specific cutter edge relative to its present condition.

As illustrated in FIG. 1a the cutter edge 34 is mechanically interlinked to the optical detector 24 via the cutter 32, milling tool 22, work tool chuck 12, work tool carrier 10, work tool support 20, machine support link 18, and the optical assembly 26. The cutter edge 34 is also optically interlinked to the optical detector 24. This creates what we call the frame loop (24-32-22-12-10-20-18-26-24). The part position finder 44 receives a request 50 to find cutter edge radii-(y) and length (z)-positions. The computer 48 finds the cutter edge positions by translating the fiducial pattern model 36 in the y- and z-directions to obtain that all the frame positions in this loop become consistent with each other. By starting with a given position, and calculating the positions mapped through the closed loop, we know that we should come back to the same position. I.e. one key purpose of the part position finder 44 of this invention is to ensure that, when positions are mapped through the whole loop, all positions that are members of a given closed loop should map back on to themselves. Now when the cutter edge might be in another position relative to the initial fiducial pattern model 36 then the frame positions of the loop (24-32-22-12-10-20-18-26-24) are not longer consistent with each other. The part position finder 44 then applies the part change constraint 68 that only the frame representing the fiducial pattern model 36 is allowed to translate in the y- and z-directions. Except for the carrier 14B and 14C displacements, taken care of by the machine positions 60, all other frames are assumed to have not moved relative to each others.

PCT/NO2005/000336 describes a range of mathematical methods that can be used to solve a loop inconsistency. Here we assume that the mathematical problem of restoring consistency is obtained by solving a set of linear equations, describing the transforms between the different frames. This can be accomplished by use of 4×4 matrices describing the 3D (three-dimensional translation and rotation by means of so called homogenous coordinates. In the present example the y-z translations between the original fiducial pattern image model 52 position and the new position are two known values (found by means of the above spline least square calculation), and the y-z-translations of the fiducial pattern model 36, the searched part change 72, are two unknown values. By this means, the part position finder 44 calculates the fiducial pattern model 36 translations and thereby also the cutter edge positions.

If the fiducial pattern image model 52 is shifted, a major fraction of the optical detector 24 size, optical distortion may affect accuracy. In that case, the fiducial pattern image model 52 comparison with the fiducial pattern image 58 may have to be found by an unlinear mathematical method. One such approach is to map positions in the initial fiducial pattern image model 52 to its fiducial pattern model 36 counterparts, then change the position of the fiducial pattern model 36, and finally map positions back from the fiducial pattern model 36 to the fiducial pattern image model 52. This process might have to be repeated iteratively, but not necessarily. The final step can be based on the linear approach described above. By this approach, as the fiducial pattern image model 52 is shifting it is also changing shape to compensate for optical distortion, and the comparison with the fiducial pattern image 59 will be more accurate. The end result of this (iterative) mapping approach will be both the new searched position and shape of the fiducial pattern image model 52, and the new position of the fiducial pattern model 36. The searched part change 72 is given by this fiducial pattern model 36 position change.

Earlier we saw how to create a new fiducial pattern image model 52A by adapting a mathematical function, a spline, to the recorded geometry. Alternatively, we may take the shifted fiducial pattern models 36 for each of the cutter edges 34 to represent an alternative best fit adaptation to this milling tool 22. We assume that the tool is clean. Therefore, this new model can also be saved as a new fiducial pattern model 36 describing this specific milling tool 22 together with its ID, and making it possible to later check wear and buildup from this initial state.

EXAMPLE 2

This example is similar to Example 1, but the milling tool 22 is diameter is larger and rotating at a slower speed of e.q. 7200 rpm (rotations per minute). The illuminator pulses are synchronized 76 with the optical detector image timing. The edges 34 in the present example might be contaminated by residues of oil, water, machining chips, etc. The milling tool 22 is a tool with ID (Identification Number). A fiducial pattern image model 52, specifically made for this identified tool, is applied. Example 1 shows how such a model can be made.

The present example is illustrated in FIGS. 1a-c. The part position finder 44 can be embodied as process within a computer, personal computer, dedicated processor, or similar. In this example, we shall assume that part position finder 44 processes are carried out by means of a computer that takes care of both the machine NC (Numerical Control) together with processes dedicated to the control and monitor of the optical assembly 26. The request 50 is entered from a keyboard telling that the machine part is a rotating milling tool 22, rotating at the speed of e.g. 7200 rpm. The request 50 specifies the milling tool 22 ID, and that a previously made fiducial pattern image model 52 should be used. The request may also define the measurement quality needed in terms of angular rotation resolution, e.g. 3.6 degrees. An illuminator 42 receives the control 54 from the position finder 44 to create pulsed illumination of the fiducial pattern 34 along the optical path 56A.

To optically freeze the rotation movement, and obtain a predictable fiducial pattern image 58 exposure and exposure timing, the illuminator 42 is in the present example a dedicated electronic circuit running with an internal timer 40 at the repetition rate of e.g. 0.1 microseconds. An optical detector 24 is free running at a timing rate of 45 images per second provided by the timer 38. It records along the optical path 58B fiducial pattern images 58 of the fiducial pattern 34, the cutter edges, while the milling tools rotates at the speed of 7200 rpm. The images are relayed to the part position finder 44.

A magnified and rotated view of the milling tool 22 and its cutter edges 34 is shown in the magnified illustrations of FIGS. 1b-c. The coordinate axes of FIGS. 1a-b indicate the orientation of the different views. In FIG. 1c contaminants 62, due to oil, water, and machining chip residues, are indicated. In the present example we do not assume that cutter edges contain buildup 64 or wear 66. The cutter edge 34 is back illuminated by the illuminator 42 and the fiducial pattern images 58 are shadow images of the cutter edges 34 in different angular orientations.

When the milling tool rotates at the speed of 7200/60=120 rotations per second, and the optical detector 24 operates with 45 images per second, there will be a non-integer number of edge passing per image. I.e. if the illumination pulses were created as a continuous series of equally spaced pulses the fiducial pattern images 58 would flicker in brightness and the center time of the exposure would vary in a slightly unpredictable manner. To come around that problem, in the present example, we assume that the illuminator pulse timing is synchronized 76 to the optical detector timing 38, within the 0.1 microsecond precision of the illuminator timer 40. The part position finder 44 calculates an illumination pulse train that gives the same number of pulses per image, and where the exact exposure center time of those pulses results in a predictable, but slightly uneven, angular spacing recording around the milling tool circumference. In the present example the number of pulses per image is truncated down to 2. On the basis of defining the 7200 rpm tool rotation speed, and the input request 3.6 degrees angular rotation resolution, the part position finder 44 calculates the pulse width and pulse distance within each image. 7200 rpm is equal to 120 rotations per second. In order to cover the full circumference in 2.22 seconds (360/3.6=100 images at a rate of 45 images per second) this would within each image give an illumination pulse distance equal to $1/120$ seconds. In order to optically freeze the rotation movement the pulse width should be less than the passing time of the angular resolution width, i.e. less than $(1/120)*(3.6/360)=0.000083$ (83 microseconds).

These illumination parameters are given to the illuminator 42 as the control 54 signal from the part position finder 44. The internal pulse calculations of the part position finder 44 ensure that no pulse is made in the neighborhood of the image shifts ("blanking" period). The full tool circumference is divided into 100 angular positions (100 images). The part position finder 44 also ensures that the timing of the pulse train of each image refers to the same angular position, and that the next image refers to another angular position around the tool circumference, until all 100 positions are covered with nearly equally spaced recordings. If the rotation speed is slower than the image rate this calculation may rely on jumping a prime number, smaller than 100, of angular positions between each image. The fiducial pattern images 58 are by known means converted/digitized and will be available for part position finder 44 operations. The part position finder 44 saves these 100 images in the given 2.22 seconds. Without delay the milling tool 22 position, represented by the positions of the encoders 14B and 14C, the machine positions 60, are recorded by the part position finder 44.

An idea of the present invention is that the optical detector 24 timer 38 and/or illuminator 42 timer 40 need not be synchronized to the tool 22 rotation, i.e. no tachometer reading is necessary. Since the series of images were recorded at an arbitrary angular starting position in the rotation cycle, the part position finder 44 first have to refer each fiducial pattern image 58 to an identified angular position. To do that the part position finder 44 creates a function of the extreme +y-cutter edge positions of all images as a function of image number. From this function it calculates the angular positions of the maxima relative to these images. With four cutter edges this creates four function maxima. There will also be a nearest neighbor image to each of those four maxima. These images will be marked as the primary fiducial pattern images 58 of the cutter edge 34. We assume that the tool diameter is so large that the rotation axis is located outside the optical detector 24 field of view and that the extreme +y-positions of the cutter edges are placed close to the image center. With the tool in this position four primary edge images are recorded.

Then, in order to record the four images on the other side the machine would have move the milling tool its own diameter in the y-direction, before another series is recorded and analyzed. For these one-sided radius position measurements the position of the rotation axis needs to be known. We assume that the rotation axis position has been earlier calibrated into the part position finder 44, otherwise look at Example 4 that amongst others describes an example of that kind of calibration. The fiducial pattern model 36 is in FIG. 1c indicated with a dashed line. For clarity it is shifted slightly to the right compared to the fully drawn line that represents one of the primary fiducial pattern images 58. The present example assumes that the cutter edges 34 include contaminants 62. In the present example the part change constraints 68 are defined by the cutter edge positions that are allowed to shift radially, in the y- and z-directions. This shift might be due to the positioning of the milling tool 22 inside the chuck 12, or due to the fact that the positions of the cutter edges 34 are manufactured slightly different from the nominal model.

As described earlier the machine position data 60 are added to the corresponding frame positions. The part position finder 44 initial conditions are defined by part geometry relations 70 that have been earlier calibrated into the part position finder 44. At the time of the optical assembly 26 alignment and calibration the optical assembly 26 part geometry relations 70 are created. See e.g. Example 4. This ensures that the initial part geometry relations 70 of FIG. 1a, where the optical detector 24 includes—the fiducial part image model 52, and the milling tool 22 includes the fiducial pattern model 36, are consistent with each others. In this example the fiducial pattern image model 52 is placed in the center of the field of view and made to make all coordinate frames reproduce correctly any spatial position within the geometry, and especially that the calculation of a position through any closed loop of the part geometry relations 70 of FIG. 1a replicates itself.

The primary fiducial pattern images 58 of the cutter edges 34, the image angular distance from the maximum positions mentioned above, and the corresponding machine position data 60, are fed into the part geometry relations 70 of the part position finder 44. The part position finder 44 first calculates a raw data version of the primary fiducial pattern image 58 and rotates those data into the maximum position. The raw data are found by means of conventional image processing edge finding routines. The part position finder 44 then calculates the y- and z-displacements of the fiducial pattern image model 52 that best fit the rotated raw data positions calculated above. The part position finder 44 creates a mathematical spline function describing the fiducial pattern image model 52. It then iteratively displaces this image model in the y- and z-directions to best fit the rotated raw data. The spline displacements are calculated by iteratively translating the model spline in the y- and z-direction and finding the minimum of the least square sum of distances between the spline and raw data.

To remove the effect of contaminants 62 the part position finder 44 then removes all raw data that both are smaller than a certain length along the spline and outside a certain threshold distance from the image model 52. In order to improve the accuracy it may repeat this removal process several times. The end result is a slightly displaced fiducial pattern image model 52.

Optionally the part position finder 44 adapts a mathematical spline to the remaining raw data in a least square sense by iteratively deforming the spline and finding the minimum of the least square sum of distances between the spline and the raw data. We shall call this spline the adapted fiducial pattern image model 52A. Alternatively the displacements can then be found by finding the y- and z-extrema of respectively the adapted fiducial pattern image model 52A and the fiducial pattern image model 52 spline and subtract those values from each others. The above calculations are repeated for all four cutter edges. Note that the adapted fiducial pattern image spline function 52A, describing the rotated cutter edge image 58, and where the effect of the contaminants 62 are removed, can be transformed into a new fiducial pattern image model 52 specifically representing the geometry of the identified cutter edge. This new model makes it possible to later check the wear and buildup of this specific cutter edge. Note that, instead of all the spline calculations in the present example, a number of other smooth adaptation functions could do the job.

As illustrated in FIG. 1a the cutter edge 34 is mechanically interlinked to the optical detector 24 via cutter 32, milling tool 22, work tool chuck 12, work tool carrier 10, work tool support 20, machine support link 18, and the optical assembly 26. The fiducial pattern 34 is also optically interlinked to the optical detector 24. This creates what we call the frame loop (24-32-22-12-10-20-18-26-24). The part position finder 44 receives or issues a request 50 to find cutter edge radii-(y) and length (z)-positions. As a result of the image displacement of the fiducial pattern image model 52, the part position finder 44 finds the cutter edge positions 34 by translating the fiducial pattern model 36 in the y- and z-directions, and by ensuring that all the frame positions in this loop again become consistent with each others. If the cutter edge is translated relative to the initial fiducial pattern image model 52 then the frame positions of the loop (24-32-22-12-10-20-18-26-24) are no longer consistent with each other. The part position finder 44 then applies the part change constraint 68 that only the frame representing the fiducial pattern model 36 is allowed to translate in the y- and z-directions. Except for the carrier displacements 14B and 14C, taken care of by the machine positions 60, all other frames are assumed to have not moved relative to each others.

We apply the previous 4×4 matrices describing the 3 dimensional translation and rotation by means of so called homogenous coordinates. In the present example the y-z translations to fit fiducial pattern image model 52 to the fiducial pattern image 58 are two know values (found by means of the above spline least square calculation), and the y-z-translations of the fiducial pattern model 36, the searched part change 72, are two unknown values. By this means the part position finder 44 calculates the fiducial pattern model 36 translations and thereby also the cutter edge position.

Earlier we explained how we could create a new fiducial pattern image model 52 by adapting the geometry of a mathematical function, a spline. Alternatively we may take the shifted fiducial pattern models 36 for each of the cutter edges 34 to represent an alternative best fit adaptation to an identified milling tool 22. We have removed the effect of contaminants 62. Therefore, this new model can be saved as a fiducial pattern model 36 describing this specific milling tool 22 that may even carry contaminants, but still making it possible to later check wear and buildup of the tool.

EXAMPLE 3

This example is similar to Examples 1 and 2, but the timing of the optical detector 24 is synchronized 76 by the illuminator 42, and the milling tool 22 is a used tool with seven cutters 32. I.e. in addition to the fact that the cutter edges might be contaminated by residues of oil, water, machining chips, etc., the cutter edge geometry might be distorted due to buildup 64 and wear 66. The present example also demonstrates how a fiducial pattern image model 52, adapted from the geometry of the same tool in a previous stage, helps characterizing this used tool.

The present example is illustrated in FIGS. 1a-c. The part position finder 44 can be embodied as process within a computer, personal computer, dedicated processor, or similar. In this example we shall assume that part position finder 44 processes are carried out by means of two computers that exchange messages, where one computer takes care of the machine NC (Numerical Control) 46 while the other 48 controls processes dedicated to the control and monitor of the optical assembly 26. The request 50 is entered from a keyboard telling that the machine part is a rotating milling tool 22. The NC computer controls the rotation speed to be e.g. 5000 rpm. The request 50 identifies the milling tool 22 with its ID, and that an earlier defined ID fiducial pattern image model 52 should be used. That earlier defined model might originally have come from a CAD drawing or from measurements similar to the ones outlined by e.g. Examples 1 and 2. The request may define the measurement quality needed in terms of angular rotation resolution, e.g. 1.8 degrees; otherwise internal parameters of the part position finder are used.

An illuminator 42 receives the control 54 from the position finder 44 to create pulsed illumination of the fiducial pattern 34 along the optical path 56A. To optically freeze the rotation movement and obtain correct image exposure timing the illuminator 42 is in the present example a dedicated electronic circuit running with an internal timer 40 at the repetition rate of e.g. 1.6 microsecond. In the present example the optical detector 24 has an input to synchronize its timer 38 to a down conversion of the illuminator internal timer 40, to create 50 images per second. The optical detector 24 records along the optical path 56B fiducial pattern images 58 of the fiducial pattern 34, the cutter edges, while the milling tools rotates at the speed of 5000 rpm. The images are relayed to the part position finder 44. A magnified and rotated view of the milling tool 9 and its cutter edges 34 is shown in FIG. 1c. The coordinate axes of FIGS. 1a-c indicate the orientation of the different views. In FIG. 1c contaminants 62, possibly due to oil, water, and machining chip residues, is indicated. The same illustration schematically shows buildup 64 and wear 66. The cutter edge 34 is back illuminated by the illuminator 42, and the fiducial pattern images 58 are shadow images of the cutter edges 34 in different angular orientations.

When the milling tool rotates at the speed of 5000/60=83.33 rotations per second, and the optical detector 22 operates with 50 images per second, there will be a non integer number of edge passing per image. I.e. if the illumination pulses were created as a continuous series of equally spaced pulses the detector 22 images would flicker in brightness and the mean time of the exposure would vary in an unpredictable manner. To come around that problem, in the present example, we assume that the optical detector timer 38 is synchronized 76 to the illuminator timer 40. Then the part position finder 44 calculates an illumination pulse train that gives the same number of pulses per image, and where the exact mean exposure of those pulses results in a predictable, but slightly uneven, image reference to angular spacing around the milling tool circumference. However this slight variation is controlled and taken into account by the part position finder 44. In the present example the number of pulses per image is truncated down to 1. On the basis of the input request defining the 5000 rpm tool rotation speed, and the 1.8 degrees angular rotation resolution, the part position finder 44 calculates the pulse width and pulse position within each image. 5000 rpm is equal to 83.33 rotations per second. In order to cover the full circumference in 4 seconds (360/1.8=200 images at a rate of 50 images per second) this would give an illumination pulse rate close to 83.33 pulses per second. In order to optically freeze the rotation movement the pulse width should typically be less than the passing time that corresponds to the part (1.8/360) of one rotation cycle, i.e. less than (1/88.33)*(1.8/360)=0.000056 (56 microseconds).

These illumination parameters are given to the illuminator 42 as the control 54 signal from the part position finder 44. The internal pulse calculations of the part position finder 44 ensure that no pulse is made in the neighborhood of the image shifts ("blanking" period). The full tool circumference is divided into 200 angular positions (200 images). The part position finder 44 also ensures that the next image refers to the next angular position around the tool circumference, until all 200 positions are covered. If the rotation speed is slower than the image rate this calculation may rely on jumping a prime number of angular position between each image that is less than 200. The fiducial pattern images 58 are by known means converted/digitized and will be available for part position finder 44 operations. The part position finder stores these 200 images in 4 seconds. Without delay the milling tool 22 machine positions 60, represented by the positions of the encoders 14B and 14C, are recorded by the part position finder 44.

Since the series of images were recorded at an arbitrary angular starting position in the rotation cycle, the part position finder 44 first have to refer each fiducial pattern image 58 to an identified angular position. To do that the part position finder 44 creates a function of the extreme +y-cutter edge positions of those images as a function of image number. From this function it calculates the angular positions of the maxima relative to the images. With seven cutter edges this creates seven function maxima. There will also be a nearest neighbor image to each of those seven maxima. However, since these data may contain the effects of contaminant 62 and buildup 64, first the part position finder 44 calculates a raw data version of the fiducial pattern images 58 (the raw data can be calculated by means of conventional edge finding routines). In order to find reliable maximum positions of the image edge projections it then, for all images, remove the effect of the contaminants 62 and buildup 64 by searching for local protrusions along the image periphery. To aid this process it also creates a smooth mathematical spline function that adapts itself to the periphery raw data in a least square distance sense, and removes those raw data that protrude a certain threshold outside the spline, like the process described in Example 2. Then the extreme +y-cutter edge positions can be found. Those images closest to the found maxima will be marked as the primary fiducial images 58 of the cutter edge 34.

We assume that the tool diameter is so large that the rotation axis is located outside the optical detector 24 field of view and that the extreme +y-positions of the cutter edges are placed close to the image center. With the tool in this position seven primary edge images are recorded. Then, in order to record the seven primary images on the other side the machine moves the milling tool its own diameter in the y-direction, before another series is recorded and analyzed. For these one-sided radius position measurements the position of the rotation axis needs to be known. In this example the rotation axis position has been earlier calibrated into the part position finder 44 or calculated from these two-sided measurements. Example 4 describes an example of that kind of calibration. The fiducial pattern model 36 is in FIG. 1c indicated with a dashed line. For clarity it is shifted slightly to the right compared to the fully drawn line that represents one of the primary fiducial pattern images 58. The present example assumes that the cutter edges 34 possibly include contaminants 62, buildup 64, and wear 66. In the present example the part change constraints 68 are defined by the cutter edge positions that are allowed to shift in the y- and z-directions. This shift might be due to the positioning of the milling tool 22 inside the chuck 12, due to the fact that the positions of the cutter edges are manufactured slightly different from the model, or a range of other possible causes.

As described earlier the machine positions 60 are added to the corresponding frame positions. On the basis of exact distortion calibration the fiducial pattern image model 52 and the fiducial pattern model 36 are made to map each others. For simplicity the fiducial pattern image model 52 is placed in the center of the field of view. This ensures that the initial part geometry relations 70, where the optical detector 24 includes the fiducial part image model 52, and the milling tool 22 includes the fiducial part model 36, are consistent with each others, and especially that the calculation of a position through any closed loop of the part geometry relations 70 replicates itself.

To find the fiducial pattern image shift the calculations follows pretty much the same procedure as in e.g. Example 2. The end result is a displaced ID fiducial pattern image model 52. This model is now used to characterize buildup 64 and wear 66. Those raw data that protrude outside the image model are identified as possible buildup 64, and the position finder 44 characterize them by measures like the number of protrusions, position of protrusion, the maximum protrusion distance from model, area of protrusion, length of protrusion, etc. Those raw data that go inside the model are identified as possible wear 66, and the position finder 44 characterize them by measures like the number of wears, position of wear, the maximum wear distance from model, area of wear, length of wear, etc. Note as earlier that, instead of all the spline calculations in the present example, a number of smooth adaptation functions could equally well do the job.

To find the fiducial pattern model shift that corresponds to the fiducial pattern image shift, the calculations of the present example follow pretty much the same procedure as in e.g. Example 2. The frame loop is identified, part change constrains 68 are applied, and those fiducial pattern model 36 shifts that creates the previously found image shifts are calculated. By such means the part position finder 44 calculates the fiducial pattern model 36 translations, and thereby also the cutter edge position. In addition, by reverse imaging, the part position finder 44 calculates dimensions of the possible buildup 64 and wear 66, and add that information to the part change 72 data.

EXAMPLE 4

FIGS. 2a-c is a schematic drawing illustrating, by way of example, a machine that may represent any machine such as a milling machine, drilling machine, turning machine, die sinking EDM, Wire EDM, CMM, or simply a fixed alignment/calibration jig. The purpose of this machine configuration and example is to help align and/or initialize/calibrate the optical detector 24 position and the position (axis of orientation) of the optical path 56B, relative to the position of the machine. In this example the work tool 22 is a calibration pin. This present example illustrates how to control the y- and z-position, and tilt around the x- and y-axis, of the optical assembly 26 relative to the machine position, at the time of installation, recalibration, or service. This is done by use of a calibration pin 22 whose length has been pre calibrated. This example also illustrates how position and geometry of rotating work tools with more complicated shapes can be controlled. As illustrated in the FIGS. 2b-c the pin tip is made asymmetrical to help include the calibration of tilt around the z-axis. This pin could have had a range of different shapes but in the present example it consists essentially of two blades, 22' and 22", separated at a distance close to the optical depth of field. This is indicated by the two projections illustration of FIGS. 2b-c. The blade edges are parallel and have essentially the same lengths relative to the pin stem 22'''. Their lengths have been measured (pre calibrated) to a high accuracy. The calibration pin 22 is mounted in the tool chuck 12 and made to position itself in the z-direction by use of some mechanical locator points on the chuck and pin base, or by means of a flange to flange mechanical contact. The pin is made to rotate at a given speed of 3610 rpm. If the calibration takes place in a calibration rig, an EDM, or CMM machine the rotation speed could be much slower, e.g. in the range of 60 rpm.

The present example is illustrated in FIGS. 2a-c. The part position finder 44 can be embodied as process within a computer, personal computer, dedicated processor, or similar. In this example the part position finder 44 processes are carried out by means of one computer 48 that receives controls from the machine NC (Numerical Control) 46, and that the computer controls and monitors the optical assembly 26. The two computers are connected through a local network. This connection handles the request 50. Alternatively the request 50 can be entered to the part position finder 44 by means of a keyboard. The part geometry relations 70 and the part change constraints 68 have been loaded into the part position finder 44 at an earlier stage. The request 50 identifies the calibration pin 22 and specifies a rotation speed of e.g. 3610 rpm (around the z-axis). We assume that a pre calibrated internal fiducial pattern image model 52, describing the 3D (three-dimensional) pin tip geometry, has been earlier calibrated and saved in the part position finder 44. The calibration pin 22 position is found by recording 360 images of the fiducial pattern 34, in this case the rotating pin tip geometry. An illuminator 42 receives the control 54 from the position finder 44 to create a pulsed illumination of the fiducial pattern 34 along the optical path 56A.

To create sharp images, optically freeze the movement, the illuminator 42 pulse generation is in this case a real time kernel inside the same computer 48 that monitors the fiducial pattern images 58. The optical detector 24 is free running with a timer rate of 60 images per second provided by the timer 38. It records along the optical path 56B fiducial pattern images 58 of the fiducial pattern 34, the calibration pin tip, while the pin rotates at the speed of 3610 rpm. The images are relayed to the part position finder 44. The pin tip 34 is back illuminated by the illuminator light source 80, e.g. a LED, and the fiducial pattern images 58 represent shadow images of the pin tip 34 in different angular orientations (for ease of drawing FIG. 2a the light source 80 is drawn outside the illuminator 42, even if it is a part of the illuminator 42).

When the calibration pin 22 rotates at the speed of 3610/60=60.1667 rotations per second, and the camera operates with 60 images per second, the recording position will shift the fraction $\frac{1}{360}$ of the circumference per image. To assure that the illuminator 42 pulses are synchronized to the optical detector timer 38 we assume that the real time kernel of the part position finder synchronizes illuminator 42 pulses to the received fiducial pattern images 58. On the basis of the input request defining the 3610 rpm tool rotation speed, and the 360/360=1 degrees angular rotation resolution, the part position finder 44 calculates the pulse width and pulse distance within each image. 3610 rpm is equal to 60.1667 rotations per second. The full circumference is covered in 6 seconds (360 images at a rate of 60 images per second). In order to optically freeze the rotation movement the pulse width should be less than the passing time of the angular resolution distance, i.e. less than $(\frac{1}{60})*(\frac{1}{360})=0.000046$ (46 microseconds). These illumination parameters are given to the illuminator 42 as the control 54 signal (not shown in FIG. 1a) from the part position finder 44. The internal pulse calculations of the part position finder 44 ensure that no pulse is made in the neighborhood of the image shifts ("blanking" period). The full tool circumference is divided into 360 (360 images) equally spaced angular positions.

Two magnified views of the fiducial pattern 34 are shown in FIGS. 2b-c. The coordinate axes of FIGS. 2a-c indicate the orientation of the different views. In most cases, for example if the calibration pin 22 is fastened to the tool chuck 12 from a tool changer, its initial orientation around the z-axis is unknown. The rotation makes it possible to record a series of images and later select the optimal ones. The two views of FIG. 1b-c indicate the most interesting orientation. If the optical axis of the observation path 56B is mounted to result in an offset tilt around the y-axis, the fiducial pattern image 58 will display the two edges with different z-heights, as shown by the illustration of FIG. 2c. In the same view the mean z-positions of the 22' and 22" edges give the z-position. By collecting data from all rotation angles the spindle axis orientation around the x-axis, and its run out, can be found from the orientation of the calibration pin stem 22'''. The stem 22''' is cylindrical.

Since the series of images might be recorded at an arbitrary angular starting position in the rotation cycle, the part position finder 44 first have to refer each fiducial pattern image 58 to an identified angular position. To do that the part position finder 44 creates a function of the y-distance between the 22' and 22" blades. From this function it calculates the angular position when the distance is equal to a pre calibrated value, corresponding to the orientation of the views of the FIGS. 2b-c magnified illustrations. There will be two nearest neighbor image to these positions. These images will be marked as the primary fiducial pattern images 58 of the pin tip 34.

We assume that the pin diameter is so small that it fits inside the optical detector 24 field of view. In the present example the part change constraints 68 are defined by the pin tip positions that are allowed to shift in the y- and z-directions, and rotate around the x- and y-axes. This shift is due to the y- and z-positioning of the calibration pin 22 inside the field of view. The rotations are due to the fact that the optical detector 24 orientation around the x-axis, and the observation path 56B tilt around the y-axis relative to the machine, is not perfectly aligned.

The initialization that ensures frame loop consistency follow the general outline described earlier. The primary fiducial pattern images 58 of the pin tip 34, the image angular distance from the given 22'-22" blade y-distance described above, and the corresponding machine position data 60, are fed into the part geometry relations 70 of the part position finder 44. The part position finder 44 first calculates a raw data version of the primary fiducial pattern images 58 and rotates those data into the orientation of the given positions. The part position finder 44 then calculates the y- and z-displacements, the mean and difference z-positions of the blades 22' and 22", and the angular orientation of the pin stem 22''' of the fiducial pattern image model 52, that best fit the rotated raw data positions calculated above. The part position finder 44 creates a mathematical spline function describing a fiducial pattern image model 52 that contain three separate sub elements. To best fit the raw data it first iteratively displaces the whole image model in the y- and z-directions, and around the x-axis. It then fine tunes the position of the sub elements by repeating the iterative process for each of them. The spline displacements are calculated by iteratively translating the model spline in the y- and z-direction, rotating around the x-axis, and finding the minimum of the least square sum of distances between the spline and raw data. The process is repeated for each of the two primary fiducial pattern images that are separated with a rotation around the z-axis with 180 degrees.

In an alternative, the iterative approach, by mapping positions between the models described in the end of Example 1 can be used. Then the-sub elements are shifted as a group, not individually.

As illustrated in FIG. 2a the calibration pin 22 is mechanically interlinked to the optical detector 24 via work tool chuck 12, work tool carrier 10, work tool support 20, machine support link 18, and the optical assembly 26. The fiducial pattern 34 is also optically interlinked to the optical detector 24. This creates what we call the loop (24-22-12-10-20-18-26-24). The part position finder 44 receives a request 50 to find the y- and z-displacements, and x- and y-rotations, of the calibration pin 22. The sub elements of the fiducial pattern image model 52 are displaced from the position of its initial conditions. The part position finder 44 finds the calibration pin 22 new position by shifting the assembled fiducial pattern model 36 (not the sub elements separately) in 3D in the y- and z-directions, and rotating around the x- and y-axis, to obtain that all the frame positions in this loop become consistent with each other again. By starting with a given position, and calculating the positions mapped through a certain closed loop we know that we should come back to the same positions. I.e. the part position finder 44 of this invention ensures that, when positions are mapped through the whole loop, all positions that are members of a given closed loop should map back on to themselves. If the fiducial pattern image 58 is translated, rotated and distorted relative to the initial fiducial pattern image model 52, then the frame positions of the loop (24-22-12-10-20-18-26-24) are no longer consistent with each other. The part position finder 44 then applies the part change constraint 68 that only the frame representing the fiducial pattern model 36 is allowed to translate in the y- and z-directions, and rotate around the x- and y-axis. Except for the carrier 14B and 14C displacements, taken care of by the machine position 60, all other frames are assumed to have not moved relative to each others.

The mathematical problem of restoring loop consistency is obtained by solving a set of linear equations, describing the transforms between the different frames. This can be accomplished by use of 4×4 matrices describing the 3 dimensional translation and rotation by means of so called homogenous coordinates. In the present example the y-translation and x-rotation of the stem 22''' sub element, the z-shift of the blade 22' sub-element, the z-shift of the blade 22'' sub element, between the fiducial pattern image model 52 and the fiducial pattern image 58, are four know values (found by means of the above spline least square calculations). The 3D(imentional) y- and z-translation, and x- and y-rotations of the fiducial pattern model 36, the searched part change 72, are four unknown values. By such means the part position finder 44 calculates the fiducial pattern model 36 displacement and thereby also the calibration pin 22 position. The above process is completed for both data sets that originated from the two primary fiducial pattern images 58. From the found values the mean x-rotations represent the rotation axis angle, the mean y-translation the rotation axis y-position, and the mean z-translations the calibration pin 34 length. The mean y-rotation angle represents the rotation of the optical axis relative to the machine. The part position finder 44 output all these data as part change 72 to e.g. a monitor as a feedback to an operator that works with production, alignment, or service alignment of the optical assembly 26. The final data are saved as a part of the part geometry relations 70. The new position of the fiducial pattern model 36 of this calibration pin 22 can also be saved for later reference, alignment, calibration, and control.

EXAMPLE 5

This example describes how to control the position and wear of an EDM die 22 that might be contaminated with residues. In comparison to cutter tool and touch probe tips an EDM die can have a complicated shape without a defined radius position. The illustrations of FIGS. 3b-c indicate the shadow image of a simple die 22 in two given rotation angles. For the purpose of illustration we have selected two positions of rotation out of many, indicating two fiducial pattern 34A and 34B that are part of the die 22 control in one rotation scan, and two other fiducial patterns 34E and 34F that are part of the die control in another rotation scan. The fully drawn line shows a die 22 with wear, and the dashed line shows the geometry of a fiducial pattern model 36. The fiducial pattern model 36 might come from a CAD drawing or a previous recording of the same die without wear. The die rotates at a speed of e.g. 70 rpm.

The present example is illustrated in FIGS. 3a-c. The part position finder 44 can be embodied as process within a computer, personal computer, dedicated processor, or similar. In this example we shall assume that part position finder 44 processes are carried out by means of two computers, the machine NC computer 46, and the computer 48 that controls and monitors the optical assembly 26. The two computers are connected through a local network. This connection handles the request 50 and the resulting part change 72 data. The part geometry relations 70 have been loaded into the part position finder 44 at an earlier stage. The request 50 identifies the die 22 and specifies a rotation speed of e.g. 70 rpm (around the z-axis). We assume that a fiducial pattern model 36, describing the 3D(imentional) die geometry, is loaded into the computer 48 as a part of the request 50 (from the fiducial pattern model 36 the part position finder 44 derives the fiducial pattern image model 52).

To describe the control principles in simple terms, in the present example an x-y-plane cross section with a prism shaped die 22 makes a quadrate, and that four fiducial patterns 34 around the circumference, representing four corners with equal radii distances from the rotation center, will be studied.

In FIGS. 3b and 3c the patterns 34A and 34B illustrates two of those four patterns 34A, 34B, 34C, and 34D. Since the die 22 rotates around the z-axis all fiducial patterns refer to the same z-height, as indicated by 34A and 34B. The size of the field of view 74 is shown by the small rectangles in FIGS. 3b-c. If the die 22 is a cylinder, i.e. the cross section is a circle, the full circumference of patterns, like for example 360 patterns around the circle, could be studied. An illuminator 42 receives the control 54 from the position finder 44 to create a pulsed illumination of the fiducial patterns 34A, 34B, 34C, and 34D along the optical path 56A. To create sharp images, to optically freeze the movement, the illuminator 42 is in this case an electronic circuit that modulates a light source. An optical detector 24 is free running at a timing rate of 60 images per second provided by the timer 38. It records along the optical path 56B fiducial pattern images 58 of the fiducial patterns 34, corners of the die 22, while the die rotates at the speed of 70 rpm. 360 images are recorded.

The images are relayed to the part position finder 44. The die 22 is back illuminated by the illuminator 42 and the fiducial pattern images 58 represent shadow images of the die in different angular orientations. When the die 22 rotates at the speed of 70/60=1.1667 rotations per second, and the optical detector operates with 60 images per second, the recording position will shift the fraction 7/360 of the circumference per image. To fill the whole circumference with a series of images the nominator of this fraction should always be a prime number, like the seven in this example, and the total number of images divided by this prime number should not be an integer. The illuminator 42 pulses are synchronized as indicated by numeral 76 with the optical detector timer 38. On the basis of the input request defining the 70 rpm tool rotation speed, and the 360/360=1 degrees angular rotation resolution, the part position finder 44 calculates the pulse width and pulse distance. 60 rpm is equal to 1.1667 rotations per second. The full circumference is covered in 6 seconds (360 images at a rate of 60 images per second). In order to optically freeze the rotation movement the pulse width should be less than the passing time of the angular resolution distance, i.e. less than $(1/60)*(1/360)=0.000046$ (46 microseconds).

These illumination parameters are given to the illuminator 42 as the control 54 signal from the part position finder 44. The internal pulse calculations of the part position finder 44 ensure that no pulse is made in the neighborhood of the image shifts ("blanking" period). The full tool circumference is divided into 360 (360 images) equally spaced angular positions. The fiducial pattern images 58 are by known means converted/digitized and will be available for part position finder 44 operations. The part position finder saves these 360 images in 6 seconds. Without delay the die 22 machine positions 60 are recorded by the part position finder 44.

Two views of the fiducial pattern 34 are shown in FIGS. 3b-c. The coordinate axes of FIGS. 3a-c indicate the orientation of the different views. The views of FIGS. 3a and 3b represent two of the 360 images that are recorded. The rotation makes it possible to record a series of images and later select the ones of most interest. The two views of FIGS. 3b and 3c indicate the selected orientations for the detection of the fiducial patterns 34A and 34B corners. 34C and 34D, representing the orientation of the other two corners, are not shown. Since the series of images may be recorded at an arbitrary angular starting position in the rotation cycle, the part position finder 44 first have to find the correct angular position of each fiducial pattern images 58. To do that the part position finder 44 creates a truncated function of the extreme +y-shadow distances. A proper truncation can be calculated from the 3D fiducial pattern model 36. It then calculates the similar +y distances from the fiducial pattern images 58. These functions are shifted to find the best overlap. By use of the found shift the part position finder 44 calculates the angular orientation of the recorded images 58. The shift might not coincide with an image, but there will be a nearest neighbor image to each of the four corner positions, and a corresponding angular distance from those corner positions. These four images will be marked as the primary fiducial pattern images 58 of the patterns 34A, 34B, 34C, and 34D. In the present example the part change constraints 68 are defined by each of the die corner model 36 positions that are allowed to shift radially in the y- and z-directions. This shift is due to the y- and z-die wear 66.

As described earlier the machine position data 60 are added to the corresponding frame positions. On the basis of exact distortion calibration the fiducial pattern image model 52 and the fiducial pattern model 36 are made to map each others. For simplicity the fiducial pattern image model 52 is placed in the center of the field of view. This ensures that the initial part geometry relations 70, where the optical detector 24 includes the fiducial part image model 52, and the die 22 includes the fiducial part model 36, are consistent with each others, and especially that the calculation of a position through any closed loop of the part geometry relations 70 of FIG. 2a replicates itself.

The primary fiducial pattern images 58 of the corners, the angular distance of the distances from the ideal orientation mentioned above, and the corresponding machine encoder positions 60, are fed into the part geometry relations 70 of the part position finder 44. The part position finder 44 first calculates a raw data version of the primary fiducial pattern images 58 and rotates those data into the angular orientation of the ideal positions. The raw data are found by means of conventional image processing edge finding routines. The part position finder 44 then calculates the individual y- and z-displacements of the fiducial pattern image model 52 corner elements that best fit the rotated raw data positions calculated above. The part position finder 44 creates a mathematical spline function describing a fiducial pattern image model 52 that contain four separate sub elements. It then fine tunes the position of the sub elements by repeating an iterative process for each of them. The spline displacements are calculated by iteratively translating the model spline in the y- and z-direction and finding the minimum of the least square sum of distances between the spline and raw data. The process is repeated for each of the primary fiducial pattern images 58.

As illustrated in FIG. 3a the die 22 is mechanically interlinked to the optical detector 24 via work tool chuck 21, work tool carrier 10, work tool support 20, machine support link 18, and the optical assembly 26. The fiducial pattern 34 is also optically interlinked to the optical detector 24. This creates what we call the frame loop (24-22-21-10-20-18-26-24). The part position finder 44 receives a request 50 to find the y- and z-wear of the die corners 34. The sub-elements of the fiducial pattern image model 52 are displaced. The part position finder 44 finds the corner 34 new positions by shifting the individual fiducial pattern model 36 corner positions in 3D in a plane whose normal is parallel to the direction of observation, and by ensuring that all the frame positions in this loop become consistent with each other. By starting with a given position, and calculating the positions mapped through a certain closed loop in FIG. 3a, we know that we should come back to the same positions. I.e. one purpose of the part position finder 44 of this invention is to ensure that, when positions are mapped through the whole loop, all positions that are members of a given closed loop should map back on to themselves. If the fiducial pattern image 58 is translated relative to the initial fiducial pattern image model 52, then the frame positions of the frame loop (24-22-21-10-20-18-26-24) are no longer consistent with each other. The part position finder 44 then applies the part change constraint 72 that only the frame representing the individual corners of the fiducial pattern model 36 is allowed to translate in the y- and z-directions.

The mathematical problem of restoring loop consistency is obtained by solving a set of linear equations, describing the transforms between the different frames. This can be accomplished by use of 4×4 matrices describing the 3D (three-dimensional) translation and rotation by means of so called homogenous coordinates. In the present example the y-z-translation of each of the corner sub element, between the fiducial pattern image model 52 sub elements and the fiducial pattern images 58, are four pairs of know values (found by means of the above spline least square calculations). The effectively 2D translation of four pairs of the fiducial pattern model 36 sub elements, the searched part change 72, are four pairs of unknown values. By this means the part position finder 44 calculates the fiducial pattern model 36 sub elements displacement and thereby also the die 22 wear. The computer 48 output all these data as part change 72 to the NC computer 46 to allow the NC computer to make a decision whether the wear is acceptable or not. The part changes 72 are saved as a part of the part geometry relations 70. The new position of the fiducial pattern model 36 of this die 22 can also be stored for later reference.

The present example describes the recording of the fiducial patterns 34A-D. By moving the die 22 in the z-direction, shifting the rotation axis position in the y-direction, and repeating the rotation process, other fiducial patterns can be recorded, as indicated by the fiducial patterns 34E-F in FIG. 3*a*. If needed this rotation process can be repeated many times across the die 22.

EXAMPLE 6

This example is illustrated in FIGS. 4*a-c*. The purpose is to control the die position after it has been taken out of the machine and been put back in. From the point of recording this example is otherwise similar to Example 5, but here the EDM die 22 is illuminated and observed in reflection geometry, rather than the shadow arrangement of Example 5. The fiducial patterns 34A-D is the surface structure of the die itself. The fiducial pattern image models 52 are actually images of the surface structures 34A-D, before the die 22 is taken out. The fiducial pattern images 58 are then recorded after the die has been put back in. Techniques for finding fiducial pattern image model shifts, such as shifts of e.g. 52, are described in PCT/NO2005/000336. In comparison to Example 5, where the model sub-elements were allowed to move independently, the fiducial pattern model 36 is in this case translated and rotated as a whole in 3D to find the new six degrees of freedom of the die position.

For both examples 5 and 6 the EDM die rotation speed is smaller than for the rotating milling tools. This makes it possible to rotate the die and record fiducial pattern images 58 in a step and repeat fashion. If the die is sitting in a chuck, that defines its z-rotation angle precisely, then the above descriptions of how to refer the fiducial pattern images 58 to the correct z-angular position of rotation is made simpler.

EXAMPLE 7

Examples 1-6 describe arrangements according to the present invention where essentially one illuminator 42 and one optical detector 24 is used. In order to obtain a full 3D control, not only the image y-z-positions need to be recorded. This is indicated in FIG. 5 where a combination of two illuminator 42A-optical detector 24 arrangements is illustrated as illuminator 42A-optical detector 24A and illuminator 42B-optical detector 24B. The illuminator-detector combinations need not be arranged into one optical assembly 26 as illustrated. Depending on space requirements they can be placed separately. FIG. 5*b* shows the optical arrangement in FIG. 5*a* from a different direction of view, as indicated by the accompanying coordinate axes. 54A and 54B denote links between the detectors 24A and 24B, respectively, and the part position finder 44. 58A and 58B denote links between the part position finder 44 and the detectors 24A and 24B, respectively.

Quality Control Tool Positions Versus Rotating Tool Positions

A touch probe is suitably used inside machines to do quality control. By combining the invention of PCT/NO2005/000336 with the present invention the position of a quality control tool can be related to the position of a rotating machining tool. During position control the touch probe 22 is held by the tool chuck 12 in a static position. FIG. 6 illustrates an example where the milling tool 22 of FIG. 1 is replaced with a touch probe 22. The touch probe 22 finds positions on a work piece 30 by touching the work piece 30 surfaces with a certain force until an internal process triggers that a specific state of contact is obtained, then the machine movement stops. The touch probe tip is a sphere of a hard material, e.g. ruby. At the time of trigger the position of the position encoders 14B and 14C are read. Those positions represent the touch probe tip 34 position. The unloaded position of the touch probe 34 tip is different from the position at the time of trigger. FIG. 7 indicates a modification of an arrangement as disclosed in said PCT/NO2005/000336 and which can be used to find the touch probe unloaded position.

FIG. 7 illustrates how the touch probe trigger position can be found. In order to test the trigger position of the touch probe 22 the pneumatic rod 102 brings a glass cube 100, with a fiducial pattern 34A attached to it, into the optical detector 24 field of view. The touch probe moves against the glass cube until it triggers, and then stops. The glass cube 100 position can be then be found in a manner as e.g. disclosed in said PCT/NO2005/000336.

If we assume that the distance between unloaded and trigger positions of the touch probe 22 do not change much over time, we may not need to repeat the trigger touch probe calibration of FIG. 7 each time the touch probe is used. Since we have now been able to calibrate the position of the touch probe 22 while it is triggering, and been able to reliably refer that position to the position of the optical detector 24, we can later simplify touch probe 22 position calibrations. To finish a full touch probe calibration we only need to record an image 58 of the touch probe tip and by image processing calculate its position relative to the optical detector 24. To do that the pneumatic rod 102 is pulled back so that glass cube 100 and the fiducial pattern 34A are out of the optical detector 24 field of view. By use of the machine we bring the unloaded touch probe 22 into the field of view, as indicated by FIG. 6. Later, unless the touch probe 22 is exchanged with another one, or gone out of calibration, we may read the position of the unloaded touch probe 22 add the trigger offsets, and use those data for touch probe position calibration. It should be noted that in the touch probing method, the finding of the trigger position includes using one of a transparent, frosted glass plate attached to the glass cube, and frosting the glass cube itself.

It is conceivable to let the apparatus of the invention be adapted to be supported by a fiducial pattern cleaning device that cleans the fiducial pattern of the rotating part by means of air blowing, or blowing of a detergent agent followed by air blowing. Further, it is conceivable that the part position finder 44, the part change constraints 68, the part geometry relations 70, and the request 50 inputs are distributed on different units of equipment elected from the group of: computers, electronic processors, embedded processors, and hard wired electronics, said units capable of exchanging data for the purpose of finding the part change 72.

The invention claimed is:

1. An apparatus configured to find positional relationships and geometrical changes of a rotating part attached to or forming part of a machine when said rotating part is in a rotating mode, said geometrical changes of the rotating part caused by its state of production and use, to determine any locations on said rotating part which exhibit contaminants, and to subsequently remove or compensate effects of such contaminants present on the rotating part, the apparatus comprising:
- a detection zone in which the rotating part is to be located,
- at least one pair of an optical detector and an illuminator facing the detection zone,
- a first timer operatively connected to the optical detector,
- a second timer operatively connected to the illuminator,
- a part position finder having means for defining light modulation characteristics and issue control of the illuminator,
- said illuminator being configured to interpret said issue control and from it generate modulated illumination of the rotating part,
- said part position finder having means for creating, receiving and storing at least one pre-made fiducial pattern model or fiducial pattern image model related to a corresponding rotary reference part to thereby establish at least one fiducial pattern model of such reference part,
- a common support having attached thereto said at least one pair of illuminators and an optical detector,
- the optical detector being configured to create a set of images of at least one fiducial pattern of the illuminated rotating part,
- the part position finder being configured to:
  - mathematically characterize the optical imaging between the detection zone and the optical detector to be able to create fiducial pattern models from fiducial pattern image models, or vice versa, by mapping positions between two models,
  - receive from said optical detector said set of images of at least one fiducial pattern of the illuminated rotating part,
  - create fiducial pattern image models related to said sets of fiducial pattern images,
  - apply geometrical positional interrelations of the rotating part, other parts related to the machine, the common support, the illuminator and the optical detector, and
  - define and apply change constraints related to the rotating part, the machine and its parts, the common support, the illuminator and the optical detector, and
  - receive and interpret request defining state of rotation of the rotating part and information about either the pre-made fiducial pattern models or fiducial pattern image models to be applied,
- wherein the part position finder being further configured to:
  - remove the effects of the contaminants related to the fiducial pattern images to create fiducial pattern image representations less affected by contaminant,
  - determine difference and displacement between said fiducial pattern image representation of said rotating part and said fiducial pattern image model by modifying according to said rotating part change constraints, at least one of said geometrical positional interrelations,
  - determine machine part changes that will produce the fiducial pattern image differences and displacements relative to the fiducial pattern image model, and
  - cause machine or machine operator to take said machine part changes into account,
  - cause selected machine parts to effect required changes, and wherein the part position finder is configured to remove the effect of contaminants by removing fiducial pattern image data that extend above a certain threshold distance from a fiducial pattern image model.

2. The apparatus of claim 1, wherein said timers are interconnected for synchronized operation.

3. The apparatus of claim 1, wherein the part position finder has an input to add machine positions to a part geometry relations.

4. The apparatus of claim 1, wherein a range of fiducial patterns is distributed regularly or irregularly across a surface.

5. The apparatus of claim 1, wherein the part position finder has an input for receiving said request from one of a keyboard, a keypad unit, a machine computer numerical control unit, a processor and a computer.

6. The apparatus of claim 1, wherein the part position finder has an input for receiving machine positions from one of a keyboard, a keypad unit, a computer numerical control unit, a processor and a computer.

7. The apparatus of claim 1, wherein the part position finder is configured to output said machine part change to one of a monitor, a computer numerical control unit, a processor and a computer.

8. The apparatus of claim 1, wherein the fiducial pattern model is represented by one of ordered discrete position data, a mathematical parametric curve, a mathematical parametric surface, an image, a 2D CAD drawing, a 3D CAD drawing, and an algorithm.

9. The apparatus of claim 1, wherein the part position finder is configured to create a fiducial pattern image model from a fiducial pattern image or a mathematical parametric description.

10. The apparatus of claim 1, wherein the part position finder is configured to characterize buildup part of the machine part changes by calculating fiducial pattern image distances and areas of details that protrude outside the fiducial pattern image model.

11. The apparatus of claim 1, wherein the part position finder is configured to characterize wear part of the machine part changes by calculating fiducial pattern image distances and areas of details that extend inside the fiducial pattern image model.

12. A method for finding positional relationships and geometrical changes of a rotating part attached to or forming part of a machine when said rotating part is in a rotating mode, said geometrical changes of the rotating part caused by its state of production and use, determining any locations on said rotating part which exhibit defects or contaminants, and subsequently removing effects of such contaminants present on the rotating part, the method comprising the steps of:
- a) creating and storing a pre-made set of fiducial pattern models or fiducial pattern image models of a rotary reference part in a part position finder to establish therein a fiducial pattern model of the reference part,
- b) locating the rotating part into a detection region having at least one pair of an illuminator and an optical detector attached to a common machine related support provided a position finder having means for defining light modulation characteristics and issue control of the illuminator,
- c) causing the illuminator to interpret said issue control and from it to illuminate the rotating part with time controlled light,
- d) letting the optical detector create a set of images of fiducial patterns of the illuminated rotating part, said optical detector outputting said fiducial pattern images in a time controlled fashion,
- e) storing said set of images of the rotating part in the part position finder,
- f) providing by means of the part position finder fiducial pattern models and fiducial pattern image models related to said sets of fiducial pattern images, g) applying by means of the part position finder geometrical and positional interrelations of the rotating part, other parts related to the machine and its parts, the common machine support, the illuminator and the optical detector, h) defining and applying by means of the part position finder change constraints related to the rotating part, the machine and its parts, the common support, the illuminator and the optical detector, i) inputting to the part position finder a request defining state of rotation of said rotating part and information about the fiducial pattern model or image model related to said rotating part, j) determining by a part position finder geometrical displacement and difference between said fiducial pattern image models and fiducial pattern images of the rotating part that include removal of related contaminants on the rotating part, k) modifying by means of the part position finder, according to said change constraints, at least one of geometrical and positional interrelations to determine at least one machine part change which is able to produce a fiducial pattern image differences and displacements, and l) activating selected machine part(s) to effect required changes, and wherein an effect of contaminants is removed by removing fiducial pattern image data that extend above a certain threshold distance from a fiducial pattern image model.

13. The method of claim 12, wherein timers of the illuminator and the optical detector have synchronized operation.

14. The method of claim 12, wherein machine positions are added to a part geometry relations by means of the part position finder.

15. The method of claim 12, wherein the fiducial pattern model is represented by one of ordered discrete position data, a mathematical parametric curve, a mathematical parametric surface, an image, a 2D CAD drawing, a 3D CAD drawing, and an algorithm.

16. The method of claim 12, wherein a buildup part of part changes comprises calculating fiducial pattern image distances and areas of details that protrude outside the fiducial pattern image model.

17. The method of claim 12, wherein a wear part of part changes comprises calculating fiducial pattern image distances and areas of details that extend inside the fiducial pattern image model.

18. The method of claim 12, wherein an algorithm is used for finding a fiducial pattern outline, from this outline calculate a fiducial pattern image model and its initial position and determine difference and displacement between this initial fiducial pattern image model and the fiducial pattern image.

19. The method of claim 18, wherein an initial fiducial pattern model is created from said initial fiducial pattern image model as basis for determining part changes that produce said fiducial pattern image difference and displacement relative to the initial fiducial pattern image model.

* * * * *